(12) United States Patent
Li

(10) Patent No.: US 7,125,488 B2
(45) Date of Patent: Oct. 24, 2006

(54) POLAR-MODIFIED BONDED PHASE MATERIALS FOR CHROMATOGRAPHIC SEPARATIONS

(75) Inventor: Guang Q. Li, Foothill Ranch, CA (US)

(73) Assignee: Varian, Inc., Palo Alto, CA (US)

( * ) Notice: Subject to any disclaimer, the term of this patent is extended or adjusted under 35 U.S.C. 154(b) by 108 days.

(21) Appl. No.: 10/777,523

(22) Filed: Feb. 12, 2004

(65) Prior Publication Data

US 2005/0178730 A1    Aug. 18, 2005

(51) Int. Cl.
*B01D 15/08* (2006.01)
(52) U.S. Cl. .............................. 210/198.2; 210/502.1; 210/635; 210/656; 502/401
(58) Field of Classification Search ................ 210/635, 210/656, 659, 198.2, 502.1; 502/401
See application file for complete search history.

(56) References Cited

U.S. PATENT DOCUMENTS

| | | | |
|---|---|---|---|
| 4,298,500 A | | 11/1981 | Abbot et al. |
| 4,996,343 A | * | 2/1991 | Karger et al. ................ 556/445 |
| 5,075,371 A | | 12/1991 | Boschetti |
| 5,104,547 A | * | 4/1992 | Cabrera et al. ............. 210/656 |
| 5,234,991 A | | 8/1993 | Tayot |
| 5,268,097 A | | 12/1993 | Girot |
| 5,374,755 A | | 12/1994 | Neue |
| 5,716,705 A | * | 2/1998 | Wirth et al. ................. 428/391 |
| 5,869,724 A | * | 2/1999 | Kirkland et al. ............ 556/410 |
| 5,922,449 A | | 7/1999 | Revis |
| 6,071,410 A | | 6/2000 | Nau |
| 6,296,768 B1 | * | 10/2001 | Ng et al. ..................... 210/635 |
| 6,645,378 B1 | | 11/2003 | Liu |
| 2002/0003109 A1 | * | 1/2002 | Gjerde et al. ................ 210/635 |

OTHER PUBLICATIONS

Article by Fairbank, R.W.P. et al., entitled "Role of Surface-Adsorbed Water in the Horizontal Polymerization of Trichlorosilanes" in J. Chromatography A (1999) 830, 285-291.
Abstract of JP 59-050358 Mar. 23, 1984.
Abstract of JP62-051689 Mar. 6, 1987.
Abstract of JP 2003 279553 Oct. 2, 2003.
Article by Engelhardt, et al. entitled "Chemically Bonded Stationary Phases for Aqueous High-Performance Exclusion Chromatography" published Journal of Chromatography, 142(1977)311-320.
Article by Matlin et al., entitled "HPLC with Chemically Bonded Stationary Phases", published by Journal of HRC&CC,1980, pp. 645-646.
Article by Huang, Xiao et al., entitled "Simple Preparation and Evaluations of Amide-Octyl-Bonded Phase", published by Analytical Sciences, Jan. 2002, vol. 18, 69-72.
Article by Hyun, et al., entitled "A Mechanistic Evaluation for the Resolution of Enantiomers of a-Arylpropionic Acid Derivatives on a p-Basic chiral sStationaaary Phases", published J. Liquid Chromatogrphy, vol. 17, No. 2 1994, 317-328.

(Continued)

Primary Examiner—Ernest G. Therkorn
(74) Attorney, Agent, or Firm—Cynthia Moore; Bella Fishman

(57) ABSTRACT

Novel compositions are disclosed for use as a stationary phase in chromatography comprising an inorganic substrate that is modified with at least one silane having the formula $R^1_\delta\text{-}Q_\alpha\text{-}(CH_2)_\beta SiR^2_\gamma X_{3-\gamma}$. In a preferred embodiment, the inorganic substrate is silica gel and is modified with at least two silanes. Methods of preparation and use in chromatographic applications are disclosed. The novel compositions provide superior chromatographic performance, reduced silanol activity, enhanced stability, and reproducibility in preparation and performance.

29 Claims, 24 Drawing Sheets

Si-OH

Si-OH $R^1_\delta\text{-}Q_\alpha\text{-}(CH_2)_\beta SiR^2_\gamma X_{3-\gamma}$, $Q_\alpha\text{-}(CH_2)_\beta SiR^2_\gamma X_{3-\gamma}$,

OTHER PUBLICATIONS

Book by UD Neue, entitled HPLC Columns: Theory, Technology, and Practice, published by Wiley-VCH, Inc. New York (1997), Copyright Page Only.

Book by EF Vansant et al., entitled "Characterization and Chemical Modification of the Silica Surface" published by Elsevier Science B.V., New York (1995). Preface Only.

Book by RPW Scott, entitled Silica Gel and Bonded Phases, Their Production, Properties and Use in LC, published by John Wiley & Sons, New York (1993) Contents Only.

Artical by LC Sander, et al. entitled "Synthesis and Characterization of Polymeric C18 Stationary Phases for Liquid Chromatography" published Analytical Chemisrtry, vol. 56, No. 3, Mar. 1984, pp. 504-510.

Article by P Tundo et al., entitled "Synthesis, Catalytic Activity, and Behavior of Phase-Transfer Catalysts Supported on Silica Gel. Strong Influence of Substrate Adsorption on the Polar Polymeric Matrix on the Efficiency of the Immobilized Phosphonium Salts" published by Journal of the American Chemical Society, 101:22/ Oct. 24, 1979, pp. 6606-6613.

Article by N Ol et al., entitled High-Performance Liquid Chromatographic Separation of Enantiomers on (1,R,3R)- Trans-Chrysanthemic Acid and its Amide Derivatives Bonded to Silica Gel, published by Eisevier Science Publishers BV, 1983, pp. 487-493.

Article by A Nomura et al., entitled "Acylation of Aminopropyl-Bonded Silica Gel for Liquid Chromatography", published by Analytical Sciences, Jun. 1987, vol. 3, pp. 209-212.

Article by B Buszewski et al., entitled "Chemically Bonded Phases for the Reversed-Phase High-Performance Liquid Chromatographic Separation of Basic Substances", published by Journal of Chromatography, 552, (1991), pp. 415-427.

Article by T Ascah et al., entitled "Novel, Highly Deactivated Reversed-Phase for Basic Compounds" published by Journal of Chromatography, 506, (1990), pp. 357-369.

Article by JE O'Gara et al., entitled "Systematic Study of Chromatographic Behavior vs Alkyl Chain Length for HPLC Bonded Phases Containing an Embedded Carbamate Group" published by Anal. Chem, 1999, 71, pp. 2992-2997.

Book entitled "Handbook of Chemistry and Physics",—Table of Constant RH Solutions, published by Chemical rubber Co. Press, Cleveland, Ohio pp. 15-20 & 15-21.

Article by GQ LI, entitled Reversed Phase HPLC Columns for Drug Discovery and Pharmaceutical Method Development, present at Pittcon 2003. pp. 1850-11P.

* cited by examiner

C-18

Phase 1

C-18

Phase 1

C-18

Phase 1

C-18

Phase 1

C18

Phase 8

Phase 3

C18

Phase 8

Phase 3

C18

Phase 8

Phase 1

A

B

C18

Phase 3

Phase 1

C18

Phase 3

Phase 1

C8

Phase 2

POLAR-MODIFIED BONDED PHASE MATERIALS FOR CHROMATOGRAPHIC SEPARATIONS

FIELD OF THE INVENTION

This invention relates generally to compositions and substrates useful in chromatographic separations.

BACKGROUND OF THE INVENTION

The preparation of bonded phases to be used as the stationary phase for chromatographic applications has been widely studied. Silanes are the most commonly used surface modifying reagents to prepare bonded phases in liquid chromatography. The chemistry of silanes with various surfaces is well studied. A general discussion of the reaction of silanes with the surface of silicaceous chromatographic support materials is provided in *HPLC Columns: Theory Technology, and Practice*, U. D. Neue, Wiley-VCH, Inc., New York (1997). Additional details on the reaction of silanes with porous silicas are disclosed in *Characterization and Chemical Modification of the Silica Surface*, E. F. Vansant, et al., Elsevier Science B.V. New York (1995). A broad description of the reactions of silanes with a variety of materials is given in *Silica Gel and Bonded Phases, Their Production, Properties and Use in LC*, R. P. W. Scott, John Wiley & Sons, New York (1993).

The preparation of bonded phases has been described using monofunctional, bifunctional and trifunctional silanes (L. C. Sander et al., (1984) *Anal. Chem.* 56:504–510). Monofunctional silanes can form only a single covalent bond with silica, thus producing bonded layers having inherently low stability. The bifunctional silanes create bonded layers of somewhat higher stability since they have the capacity to form more chemical bonds. Trifunctional silanes can, in principle, form the greatest number of bonds to the silica surface and hence would be expected to produce the most stable bonded phases. When a trifunctional silylating reagent is employed in place of the monofunctional surface modifying agent, a mixture of ligand surface attachments takes place. These attachments are influenced by the existence of more than a single kind of silanol species on the silica surface, as for example a free silanol (isolated), an associated silanol (vicinal), or a geminal silanol. On the other hand, the trifunctional silane can be attached to the surface by a mono-, bis-, or tris-siloxane bond. The unreacted alkoxy groups, when hydrolyzed to a free silanol, can further react with additional reagent, forming a second layer.

However, it is known that complete removal of all surface silanols is not possible, even when reacting with bi- and trifunctional silanes, because of the randomness of the bonding process and steric hindrance. Most commercially available bonded phases are based on monofunctional silanes because of difficulties in the reproducibility in preparing bonded phases using bi- and trifunctional silanes. Even a small amount of water on the surface of the silica or in the reagents or solvents can substantially increase the amount of bonded phase attached to the surface, resulting in problems in batch to batch reproducibility of the bonded phase. See U. D. Neue, supra, p. 115.

Silica gel has unique properties, which make it highly useful as a chromatographic support, and particularly applicable as a support for high performance liquid chromatography (HPLC). In particular, silica is very popular in HPLC packing because its surface can be modified with a variety of ligands resulting in bonded phases of good mechanical, thermal and chemical stability. Silica gel is the polymeric form of silicic acid, $Si(OH)_4$, in which siloxane bonds are formed between neighboring silicon atoms by eliminating water molecules. Wherever a break in the polymer structure occurs, a silanol group (Si—OH) is present. The surface density of silanol groups on silica gel is about 8 $\mu mole/m^2$. These silanol groups react with the silylating reagents. Even with the most aggressive silanization reactions no more than 50% of the silanol groups can be converted to silylated derivative because steric hindrance prevents a denser coverage of the surface. Thus, a significant portion of the original silanol groups remain, and these interact with silanophilic analytes, such as basic analytes (generally amines), during chromatographic separations. The presence of unreacted silanol groups also lead to the adsorption of basic analytes on the column, resulting in tailing and asymmetrical peaks or even the irreversible adsorption of the analyte.

Another disadvantage of silica-based bonded phases relates to pH stability. Conventional silica gel based packing materials have limited range of pH stability (2.5–7.5). At low pH, the silicon-carbon bonds break down leading to the erosion of the bonded phase. At high pH, the silica gel itself dissolves, resulting in a loss of bonded phases. In both these instances, there is degradation and irreproducibility in the chromatographic profile. Generally, the pH must be maintained at a prescribed pH, or the column undergoes irreversible damage losing its efficiency and characteristics, such as the ability to produce narrow peaks, desirable retention volumes or resolve components of a mixture. This damage can occur even if the mistaken use outside the narrow pH range defined for the column is only for a short period of time. Typically, bonded phases have a limited lifetime of a few hours, if operated at extremes of pH, to several months if operated under mild conditions. (see R. P. W. Scott, supra, p. 173). Reproducibility in the preparation of bonded phases is important to insure the continued adequacy of the bonded phase for particular separations and separation protocols, which is especially important in forensic analyses or other analytical procedures.

Partial solutions for these problems have been described, such as endcapping to remove residual silanol residues, addition of organic modifiers to the mobile phase, the use of low pH mobile phase to protonate the silanols, introduction of bulkier substituents on the silicon atom of the silane reagent in place of the methyl groups, use of bidentate ligands, formation of silicon-carbon bond in place of the normal siloxane bond between the silica and silane silicon atoms, and the use of mixed trifunctional silanes. Nevertheless, the deleterious effect of surface silanol has not been resolved to the satisfaction of practicing chromatographers.

Another partial solution to the problem of residual silanols is encapsulation of the silica support. Nonpolar linear polymers may be adsorbed onto the silica surface, followed by gamma-ray irradiation to initiate crosslinking. This yields a permanent, nonextractable coating. Such encapsulated silica or alumina supports show high efficiency and resolution for basic silanophilic compounds. Shiseido Company of Japan held encapsulation to be responsible for the superior resolution they report having observed for basic amino analytes on its S/S—C18 reversed-phase packing. However, the preparation of these materials is problematic.

A useful solution to the problem of the residual silanol groups interacting with the analytes is to generate a functionality on the modified silica surface that can react with the silica silanol through electrostatic and/or hydrogen-bonding interaction. Modification of bonded γ-aminopropyl groups by acyl chlorides, active esters, or isocyanates is well documented. A method of the acylation of a pre-formed aminopropylsilylated silica surface to prepare silica-based phase transfer catalysts carrying the acylaminoalkyl chain has been developed (P. Tundo et al., (1979) *J. Amer. Chem. Soc.* 101:6606–6613). An analogous surface modification procedure has been utilized to prepare an acylaminoalkyl-silylated silica stationary phase suitable for chiral liquid chromatography (N. Oi, et al., (1983) *J. Chromatogr.* 259: 487–493). The acylation reactions of aminopropylsilica with a variety of acid chlorides have been studied extensively by A. Nomura, et al., (1987) *Anal. Sci.* 3:209–212). This study was followed by the work of Buszewski and coworkers with extensive solid state NMR and chromatographic studies on similar acylamino derivatized silicas, termed "peptide bond carrying silicas" by the authors (see B. Buszewski, et al., (1991) *J. Chromatogr.* 552:415–427). Ascah et al. used a similar chemistry to develop Supelcosil ABZ, which was the first commercial polar-embedded phase (see T. Ascah et al., (1990) *J. Chromatogr.* 506:357–369). An analogous functionalized silica surface carrying urethane functionalities instead of amide moieties has also been reported (see J. E. O'Gara, et al., (1999) *Anal. Chem.* 71:2992–2997).

With the incorporation of a polar functional group in the alkyl ligand close to the surface of the silica gel, the phase remains solvated by water at low percentages of organic modifier and even with 100% water. Under these conditions, the alkyl chains maintain their conformational freedom and can interact with polar analytes. The presence of the polar functionality close to the surface acts to shield the effects of unreacted silanol groups. However, because this approach has two individual bonding steps, the phases contain some fraction of unreacted aminopropyl groups in addition to the alkylamide bonded ligands, an alkylester bonded ligands coming from the reaction of acyl chloride and the silanol on silica surface, and residual silanols. The possibility of mixed derivatized and underivatized groups led to potential mixed modes of separation. In addition, due to the fact that this is a side reaction of the desired stationary phase synthesis, the level of residual amino groups is difficult to control. Further, the problem of residual silanol groups, stability of the phases to acid and base, and reproducibility in preparation of the phases, remain unresolved.

These deficiencies in the art have been much improved by the stationary phases and methods of preparation of the invention, as described below.

SUMMARY OF THE INVENTION

Accordingly, it is a primary object of the invention to address the aforementioned need in the art by preparing bonded phases for chromatography that are much more reproducible from one batch to another. It is yet another object of the invention to provide bonded phases that are stable to basic and acidic elution conditions. It is yet another object of the invention to provide bonded phases that have a low silanol content, and do not exhibit tailing with basic analytes.

Accordingly, the invention provides a composition for use as a stationary phase in chromatography comprising an inorganic substrate that is modified with at least one silane having the formula

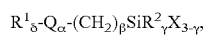

wherein $R^1$ is hydrogen, $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; $\alpha$ is 0 or 1; $\beta$ is 0–30; $\gamma$ is 0, 1 or 2; $\delta$ is 0–3; $R^2$ is $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; Q is independently selected from —NHC(O)—, —C(O)NH—, —OC(O)NH—, —NHC(O)O—, —NHC(O)NH—, —NCO, —CHOHCHOH—, $CH_2OCHCH_2O$—, —$(CH_2CH_2O)_n$—, —$(CH_2CH_2CH_2O)_n$—, —C(O)—, —C(O)O—, —OC(O)—, $CH_3C(O)CH_2$—, —S—, —SS—, —CHOH—, —O—, —SO—, —$SO_2$—, —$SO_3$—, —$OSO_3$—, —$SO_2NH$—, —$SO_2NMe$—, —NH—, —NMe—, —$NMe_2^+$—, —$N[(CH_2)_n]_2^+$—, —CN, —NC, —CHOCH—, —NHC(NH)NH—, —$NO_2$, —NO, —$OPO_3$—, where n is 1–30; and X is a leaving group.

Preferably, the inorganic substrate is a metal-oxide or metalloid oxide, such as silica, alumina, zeolite, mullite, zirconia, vanadia or titania, or mixtures or composites thereof, having reactive metal oxides capable of reacting with an alkoxysilane, hydroxysilane, aminosilane or halosilane. After modification of the inorganic substrate surface with a silane, the silane is covalently attached to the inorganic substrate via an oxygen linkage.

In preferred embodiments, the inorganic substrate is in the form of monoliths or porous particles. Monoliths include glass fibers, optical fibers, capillaries, or nonporous particles, which may be continuous with the substrate surface. Preferably the porous particles have an average pore diameter from about 60 Å to about 1000 Å, and have an average particle size from about 3 μm to about 60 μm.

In a preferred embodiment, the inorganic substrate comprises silica gel.

In another preferred embodiment, the inorganic substrate is equilibrated in an atmosphere having a defined relative humidity prior to being modified with the at least one silane. Equilibration times can vary, but are generally a few days to a few weeks in duration. Equilibration of the inorganic substrate in an atmosphere of defined relative humidity provides a constant amount of water on the surface of the silica gel substrate, enhancing batch to batch reproducibility in the preparation of modified substrates to be used as stationary phases for chromatography. Preferably, the atmosphere having a defined relative humidity is provided by hydrated salts or saturated salt solutions, including cesium fluoride, lithium bromide, zinc bromide, potassium hydroxide, sodium hydroxide, lithium chloride, calcium bromide, potassium acetate, potassium fluoride, magnesium chloride, sodium iodide, potassium carbonate, magnesium nitrate, sodium bromide, cobalt chloride, sodium nitrite, potassium iodide, strontium chloride, sodium nitrate, sodium chloride, ammonium chloride, potassium bromide, ammonium sulfate, potassium chloride, strontium nitrate, barium chloride, potassium nitrate, or potassium sulfate. Preferably, the defined relative humidity is less than 50%. In particular embodiments, the relative humidity is from about 0% to about 10%, from about 10% to about 20%, from about 20% to about 30%, from about 40% to about 50%, from about 50% to about 60%, from about 60% to about 70%, from about 70% to about 80%, from about 80% to about 90% or from about 90% to about 100%. In one preferred embodiment, the saturated salt solution is LiCl, which provides an atmosphere of relative humidity about 11% to 12%.

In one aspect, the modified inorganic substrate, when used as a stationary phase for chromatography, exhibits no more than about 3% variability in retention time, peak symmetry and retention factor for analytes separated, even when exposed to acidic or basic elution conditions for one thousand hours. Preferably, the retention time, peak symmetry and retention factor for analytes separated on said stationary phase varies by no more than about 5% even when exposed to acidic or basic elution conditions for 3000 hours.

In a preferred embodiment, the inorganic substrate is silica gel and is modified with at least two silanes. In one embodiment, the silica gel substrate is modified with a first silane, and subsequently the silica gel substrate is modified with a second silane. In another embodiment, the first or second silane or both the first and the second silanes comprises a mixture of silanes. Preferably, the modification is performed in the presence of an inert solvent such as toluene or xylene, and a scavenger, such as pyridine, triethylamine, imidazole or N,N-dimethylbutylamine, or combinations thereof. Preferably, the reaction temperature for performing the modification of the silica gel substrate is the reflux temperature of the inert solvent.

In certain preferred embodiments, the silica gel substrate is modified with at least one silane wherein $\delta$ is from 0–3, and one silane wherein $\delta$ is 0 or 1. In certain other embodiments, the silica gel substrate is modified with at least two silanes wherein $\delta$ is from 0–3.

In particular embodiments, the silica gel substrate is modified with a first silane, and subsequently modified with a second silane. The first silane can have a value for $\delta$ of from 1–3, and the second silane can have a value for $\delta$ of from 0–3.

In another embodiment, the first silane has a value for $\delta$ of 1, $\alpha$ is 1, $\beta$ is 1–30, $\gamma$ is 0, 1, or 2, $R^1$ is a substituted or unsubstituted $C_1$–$C_{30}$ hydrocarbyl, Q is amido or carbamyl, and the second silane has a value for $\delta$ of 1, $\alpha$ is 1, $\beta$ is 1–30, $\gamma$ is 0, 1, or 2, $R^1$ is a substituted or unsubstituted $C_1$–$C_6$ hydrocarbyl, and Q is amido, carbamyl, cyano or glycidoxy.

In other embodiments, the first silane has a value for $\delta$ of 1, $\alpha$ is 1, $\beta$ is 1–30, $\gamma$ is 0, 1 or 2, $R^1$ is a substituted or unsubstituted $C_1$–$C_{30}$ hydrocarbyl, Q is carbamato or urethane, and the second silane has a value for $\delta$ of 1, $\alpha$ is 1, $\beta$ is 1–30, $\gamma$ is 0, 1 or 2, $R^1$ is a substituted or unsubstituted $C_1$–$C_6$ hydrocarbyl, and Q is amido, carbamyl, cyano or glycidoxy.

In another embodiment, the first silane has a value for $\delta$ of 1, $\alpha$ is 1, $\beta$ is 1–30, $\gamma$ is 0, 1, or 2, $R^1$ is a substituted or unsubstituted $C_1$–$C_{30}$ hydrocarbyl, Q is amido, carbamate, urethane or carbamyl, and the second silane has a value for $\delta$ of 1, $\alpha$ is 1, $\beta$ is 1–30, $\gamma$ is 0, 1, or 2, $R^1$ is a substituted or unsubstituted $C_1$–$C_6$ hydrocarbyl, and Q is isocyanato, diol, ethoxy, propoxy, carbonyl, carboxy, or acetonyl.

In other embodiments, the first silane has a value for $\delta$ of 1, $\alpha$ is 1, $\beta$ is 1–30, $\gamma$ is 0, 1 or 2, $R^1$ is a substituted or unsubstituted $C_1$–$C_{30}$ hydrocarbyl, Q is amido, carbamate, urethane or carbamyl, and the second silane has a value for $\delta$ of 1, $\alpha$ is 1, $\beta$ is 1–30, $\gamma$ is 0, 1 or 2, $R^1$ is a substituted or unsubstituted $C_1$–$C_6$ hydrocarbyl, and Q is thio, dithio, ether, sulfinyl, sulfonyl, sulfonic acid, sulfate, sulfonamido, amino, nitrile, isonitrile, epoxy, guanidino, nitro, nitroso, or phosphate.

In yet other embodiments, the first silane has a value for $\delta$ of 1, $\alpha$ is 1, $\beta$ is 1–30, $\gamma$ is 0, 1, or 2, $R^1$ is a substituted or unsubstituted $C_1$–$C_{30}$ hydrocarbyl, Q is amido or carbamyl, and the second silane has a value for $\delta$ of 0, 1, 2 or 3, $\alpha$ is 0, $\beta$ is 0–30, $\gamma$ is 0, 1, or 2, and $R^1$ is H or a substituted or unsubstituted $C_1$–$C_6$ hydrocarbyl.

In another embodiment, the first silane has a value for $\delta$ of 1, $R^1$ is a substituted or unsubstituted $C_1$–$C_{30}$ hydrocarbyl, Q is amido, and the second silane has a value for $\delta$ of 1, $R^1$ is a substituted or unsubstituted $C_1$–$C_6$ hydrocarbyl, and Q is amido, cyano or glycidoxy.

In other embodiments, the first silane has a value for $\delta$ of 1, $\alpha$ is 0, $\beta$ is 8–30, $\gamma$ is 0, 1 or 2, $R^1$ is H, and the second silane has a value for $\delta$ of 1, $R^1$ is a substituted or unsubstituted $C_1$–$C_6$ hydrocarbyl, and Q is amido, cyano or glycidoxy.

In another embodiment, the first silane has a value for $\delta$ of 1, $\alpha$ is 0, $\beta$ is 8–30, $\gamma$ is 0, 1 or 2, $R^1$ is H, and the second silane has a value for $\delta$ of 1, $R^1$ is a substituted or unsubstituted $C_1$–$C_6$ hydrocarbyl, and Q is isocyanato, diol, ethoxy, propoxy, carbonyl, carboxy, or acetonyl.

In another embodiment, the first silane has a value for $\delta$ of 1, $\alpha$ is 0, $\beta$ is 8–30, $\gamma$ is 0, 1 or 2, $R^1$ is H, and the second silane has a value for 6 of 1, $R^1$ is a substituted or unsubstituted $C_1$–$C_6$ hydrocarbyl, and Q is thio, dithio, ether, sulfinyl, sulfonyl, sulfonic acid, sulfate, sulfonamido, amino, nitrile, isonitrile, epoxy, guanidino, nitro, nitroso, or phosphate.

In still another embodiment, the first silane has a value for $\delta$ of 1, $\alpha$ is 0, $\beta$ is 8–30, $R^1$ is H, $\gamma$ is 0, 1 or 2, and the second silane has a value for $\delta$ of 0 or 1, $\beta$ is 1–30, $\alpha$ is 0 or 1, $R^1$ if present is a H or substituted or unsubstituted $C_1$–$C_6$ hydrocarbyl, and Q is amido, cyano or glycidoxy.

In yet other embodiments, the silica gel substrate is further modified with at least one additional silane, such as an endcapping silane. Preferably, the endcapping silane is a monosilane, disilane, trisilane or tetrasilane, or a combination thereof. Monosilanes useful for endcapping include, for example, trimethylchlorosilane, N,N-dimethyltrimethylsilylamine, trimethylsilylimidazole, dimethyldichlorosilane, dimethoxydimethylsilane, trimethylsilanol, trimethylsilylphosphine, or N-trimethylsilylacetamide. Disilanes useful for endcapping include, for example, hexamethyldisilazane or 1,3-dimethoxytetramethyldisiloxane. Trisilanes useful for endcapping include, for example, hexamethylcyclotrisiloxane. Tetrasilanes useful for endcapping include, for example, octamethylcyclotetrasiloxane.

In another aspect, the modified inorganic substrate of the present invention is used as a stationary phase for chromatographic applications. In preferred embodiments, the chromatographic application is thin layer chromatography, high performance liquid chromatography, reversed phase chromatography, normal phase chromatography, ion chromatography, ion pair chromatography, reverse phase ion pair chromatography, ion exchange chromatography, affinity chromatography, hydrophobic interaction chromatography, size exclusion chromatography, chiral recognition chromatography, perfusion chromatography, electrochromatography, partition chromatography, microcolumn liquid chromatography, capillary chromatography, liquid-solid chromatography, preparative chromatography, hydrophilic interaction chromatography, supercritical fluid chromatography, precipitation liquid chromatography, bonded phase chromatography, fast liquid chromatography, flash chromatography, liquid chromatography mass spectrometry, gas chromatography, microfluidics based separations, solid phase extraction separations, or monolith based separations.

In particular embodiments, X is halogen, alkoxy, amino, or acyloxy. In certain embodiments, Q, $R^1$ or $R^2$ is a chiral recognition ligand. Preferably, the chiral recognition ligand is optically active, and can include additional chiral compounds, including lipids, amino acids, peptides, sugars, hydroxy substituted amines, or hydroxy substituted acids. In certain embodiments, the chiral recognition ligand is a heterocycloalkyl moiety or linked heterocycloalkyl moiety such as a cyclodextrin.

In preferred embodiments, the inorganic substrate is a silica gel substrate, and is modified by the following steps:
(a) equilibrating the silica gel substrate in an atmosphere having a defined relative humidity;
(b) modifying the silica gel substrate with at least one silane; and
(c) further modifying the silica gel substrate with an endcapping silane.

In other embodiments, a further modification step is performed after or concurrently with step (b) using a second silane. In certain other embodiments, δ for the second silane is 1 and $R^1$ for the second silane is $C_1$–$C_6$ hydrocarbyl. In particular embodiments, the modification step with the second silane is performed at the same time as the modification step with the first silane, and in yet other particular embodiments, the modification step with the second silane is performed after the modification step with the first silane.

In another embodiment, the invention provides a method for modifying an inorganic substrate, comprising the steps of
(a) equilibrating the inorganic substrate in an atmosphere having a defined relative humidity;
(b) modifying the inorganic substrate with at least one silane; and
(c) further modifying the inorganic substrate with an endcapping silane.

Preferably the silane has the formula:

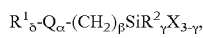

wherein $R^1$ is hydrogen, $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; α is 0 or 1; β is 0–30; γ is 0, 1 or 2; δ is 0–3; $R^2$ is $C_1$–$C_{100}$ substituted or unsubstituted hydrocarbyl, cycloalkyl, heterocycloalkyl, aryl, or heteroaryl; wherein the substituents are selected from $C_1$–$C_2$ hydrocarbyl, hydroxyl, alkoxy, halogen, amino, nitro, sulfo, and carbonyl; Q is independently selected from —NHC(O)—, —C(O)NH—, —OC(O)NH—, —NHC(O)O—, —NHC(O)NH—, —NCO, —CHOHCHOH—, $CH_2OCHCH_2O$—, —$(CH_2CH_2O)_n$—, —$(CH_2CH_2$-$O)_n$—, —C(O)—, —C(O)O—, —OC(O)—, $CH_3C(O)CH_2$—, —S—, —SS—, —CHOH—, —O—, —SO—, —$SO_2$—, —$SO_3$—, —$OSO_3$—, —$SO_2NH$—, —$SO_2NMe$—, —NH—, —NMe—, —$NMe_2^+$—, —$N[(CH_2)_n]_2^+$—, —CN, —NC, —CHOCH—, —NHC(NH)NH—, —$NO_2$, —NO, —$OPO_3$—, where n is 1–30; and X is a leaving group. In particular embodiments, the method further comprises the step of modifying the inorganic substrate with a second silane, wherein δ for the second silane is from 0–3. In additional embodiments, δ for the second silane is 0 or 1. In certain other embodiments, δ for the second silane is 1 and $R^1$ for the second silane is $C_1$–$C_6$ hydrocarbyl. In particular embodiments, the modification step with the second silane is performed at the same time as the modification step with the first silane, while in yet other embodiments, the modification step with the second silane is performed after the modification step with the first silane.

In a preferred embodiment, the inorganic substrate is equilibrated in atmosphere having a defined relative humidity provided by hydrated salts or saturated salt solutions. Preferably, the hydrated salts or saturated salt solutions include cesium fluoride, lithium bromide, zinc bromide, potassium hydroxide, sodium hydroxide, lithium chloride, calcium bromide, potassium acetate, potassium fluoride, magnesium chloride, sodium iodide, potassium carbonate, magnesium nitrate, sodium bromide, cobalt chloride, sodium nitrite, potassium iodide, strontium chloride, sodium nitrate, sodium chloride, ammonium chloride, potassium bromide, ammonium sulfate, potassium chloride, strontium nitrate, barium chloride, potassium nitrate, or potassium sulfate. In particular embodiments, the relative humidity is from about 0% to about 10%, from about 10% to about 20%, from about 20% to about 30%, from about 40% to about 50%, from about 50% to about 60%, from about 60% to about 70%, from about 70% to about 80%, from about 80% to about 90% or from about 90% to about 100%. In a particular embodiment, the defined relative humidity is less than 50%.

In one embodiment, the inorganic substrate is a metal or metalloid oxide substrate. In particular embodiments the metal or metalloid oxide comprises silica, alumina, zeolite, mullite, zirconia, vanadia or titania, or mixtures or composites thereof.

In a preferred embodiment, the invention provides a method for separating a plurality of analytes, comprising performing a chromatographic separation using a stationary phase comprising an inorganic substrate modified by at least one silane as described above. The chromatographic separation can be performed using a mobile phase that is a gaseous or a liquid. In one embodiment, the mobile phase comprises from 0 to 100% water. Preferably, the chromatographic separation is thin layer chromatography, high performance liquid chromatography, reversed phase chromatography, normal phase chromatography, ion chromatography, ion pair chromatography, reverse phase ion pair chromatography, ion exchange chromatography, affinity chromatography, hydrophobic interaction chromatography, size exclusion chromatography, chiral recognition chromatography, perfusion chromatography, electrochromatography, partition chromatography, microcolumn liquid chromatography, capillary chromatography, liquid-solid chromatography, preparative chromatography, hydrophilic interaction chromatography, supercritical fluid chromatography, precipitation liquid chromatography, bonded phase chromatography, fast liquid chromatography, flash chromatography, liquid chromatography mass spectrometry, gas chromatography, microfluidics based separations, solid phase extraction separations, or monolith based separations.

In a preferred embodiment, the method of the invention provides an improved method of separating analytes using chromatography on a silica gel substrate, the improvement being providing a silica gel substrate modified with at least one silane having the formula

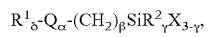

wherein $R^1$ is hydrogen, $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; α is 0 or 1; β is 0–30; γ is 0, 1 or 2; δ is 0–3; $R^2$ is $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; Q is independently selected from —NHC(O)—, —C(O)NH—, —OC(O)NH—, —NHC(O)O—, —NHC(O)NH—, —NCO, —CHOHCHOH—, CH$_2$OCHCH$_2$O—, —(CH$_2$CH$_2$O)$_n$—, —(CH$_2$CH$_2$CH$_2$O)$_n$—, —C(O)—, —C(O)O—, —OC(O)—, CH$_3$C(O)CH$_2$—, —S—, —SS—, —CHOH—, —O—, —SO—, —SO$_2$—, —SO$_3$—, —OSO$_3$—, —SO$_2$NH—, —SO$_2$NMe—, —NH—, —NMe—, —NMe$_2$$^+$—, —N[(CH$_2$)$_n$]$_2$$^+$—, —CN, —NC, —CHOCH—, —NHC(NH)NH—, —NO$_2$, —NO, —OPO$_3$—, where n is 1–30; and X is a leaving group; wherein the silica gel substrate is equilibrated in an atmosphere having a defined relative humidity prior to modification with the at least one silane, and wherein the silica gel is modified with at least one silane wherein δ is from 0–3, at least one silane wherein δ is 0 or 1, and an endcapping reagent.

In other aspects, the invention provides a chromatography column wherein the stationary phase comprises a modified inorganic substrate as described above.

In yet another embodiment, the invention provides a silane for modifying an inorganic substrate having the formula

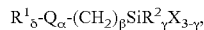

wherein R$^1$ is hydrogen, C$_1$–C$_{100}$ substituted or unsubstituted hydrocarbyl, cycloalkyl, heterocycloalkyl, aryl, or heteroaryl; wherein the substituents are selected from C$_1$–C$_{12}$ hydrocarbyl, hydroxyl, alkoxy, halogen, amino, nitro, sulfo, and carbonyl;

α is 0 or 1;
β is 0–30;
γ is 0, 1 or 2;
δ is 0–3;
R$^2$ is C$_1$–C$_{100}$ substituted or unsubstituted hydrocarbyl, cycloalkyl, heterocycloalkyl, aryl, or heteroaryl; wherein the substituents are selected from C$_1$–C$_{12}$ hydrocarbyl, hydroxyl, alkoxy, halogen, amino, nitro, sulfo, and carbonyl;
Q is independently selected from —NHC(O)—, —C(O)NH—, —OC(O)NH—, —NHC(O)O—, —NHC(O)NH—, —NCO, —CHOHCHOH—, CH$_2$OCHCH$_2$O—, —(CH$_2$CH$_2$O)$_n$—, —(CH$_2$CH$_2$CH$_2$O)$_n$—, —C(O)—, —C(O)O—, —OC(O)—, CH$_3$C(O)CH$_2$—, —S—, —SS—, —CHOH—, —O—, —SO—, —SO$_2$—, —SO$_3$—, —OSO$_3$—, —SO$_2$NH—, —SO$_2$NMe—, —NH—, —NMe—, —NMe$_2$$^+$—, —N[(CH$_2$)$_n$]$_2$$^+$—, —CN, —NC, —CHOCH—, —NHC(NH)NH—, —NO$_2$, —NO, —OPO$_3$—, where n is 1–30; and
X is a leaving group.

Additional objects, advantages and novel features of the invention will be set forth in part in the description which follows, and in part will become apparent to those skilled in the art upon examination of the following, or may be learned by practice of the invention.

BRIEF DESCRIPTION OF THE DRAWINGS

The invention may be more fully understood by having reference to the following drawings, wherein.

DETAILED DESCRIPTION OF THE INVENTION

I. Definitions and Overview

Figure 1:
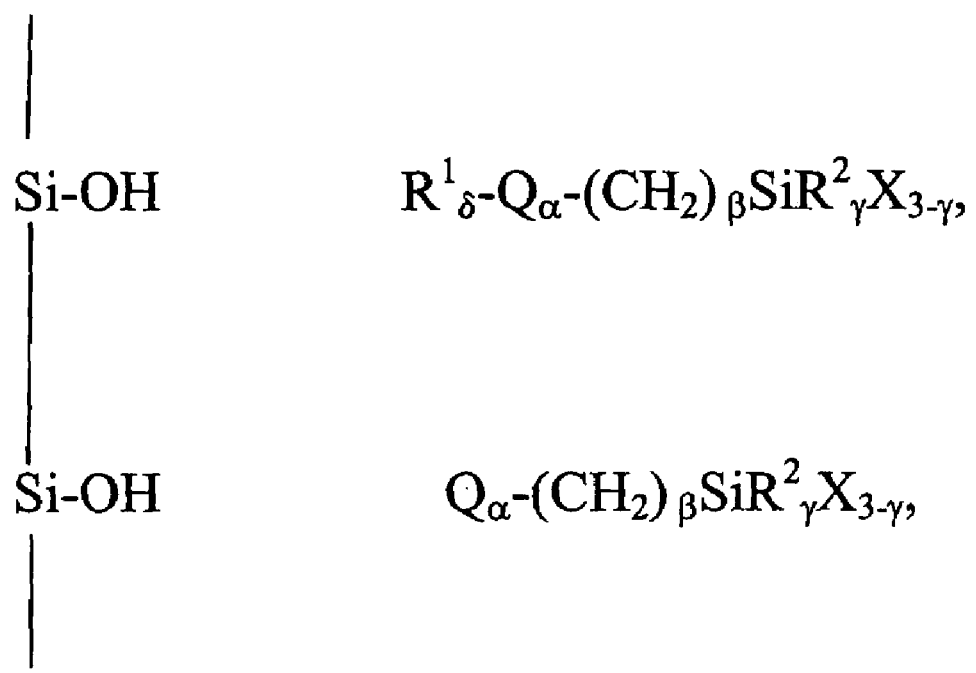
FIG. 1 schematically illustrates the synthetic reaction of silane with silica gel to produce a polar-modified bonded silica gel.

Before the present invention is described in detail, it is to be understood that unless otherwise indicated this invention is not limited to specific alkyl, aryl or polar groups, as such may vary. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a solvent" includes two or more solvents; reference to "silane" includes two or more silanes, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

As used herein, carbonyl moieties are designated "C(O)."

As used herein, Q is defined as —NHC(O)—, denoting (amido), —C(O)NH—, (carbamyl), —OC(O)NH—, (carbamato), —NHC(O)O—, (urethane), —NHC(O)NH—, (carbamido or urea), —NCO, (isocyanato), —CHOHCHOH—, (diol), CH$_2$OCHCH$_2$O— (glycidoxy), —(CH$_2$CH$_2$O)$_n$—, (ethoxy), —(CH$_2$CH$_2$CH$_2$O)$_n$—, (propoxy), —C(O)—, (carbonyl), —C(O)O—, (carboxy), CH$_3$C(O)CH$_2$—, (acetonyl), —S— (thio), —SS— (dithio), —CHOH— (hydroxy), —O— (ether), —SO—, (sulfinyl), —SO$_2$—, (sulfonyl), —SO$_3$— (sulfonic acid), —OSO$_3$— (sulfate), —$SO_2NH$—, —$SO_2NMe$—, (sulfonamido), —NH—, —NMe—, —$NMe_2^+$—, —$N[(CH_2)_n]_2^+$— (amines), —CN (nitrile), —NC (isonitrile), —CHOCH— (epoxy), —NHC(NH)NH—, (guanidino), —$NO_2$ (nitro), —NO, (nitroso), and —$OPO_3$— (phosphate), where Me refers to methylene or methyl, and where n is an integer up to 30, generally is less than 10. It should be noted that Q provides for the possibility of more than a single polar moiety. For example, Q encompasses glycidoxy, which possesses both an epoxy and an ether functionality, and the polyethers polyethoxy and polypropoxy.

The term "glycidoxy" is used interchangeably with "glycidyloxy," and denotes the epoxy functionality $CH_2OCHCH_2O$—.

As used herein, the term "alkyl bonded phase" refers to the modified inorganic substrate modified with a silane according to the invention wherein α is 0, δ is 0, and β is at least 6, resulting in a modified inorganic substrate bearing alkyl moieties. Alternatively, the term "alkyl bonded phase" can refer to the modification with a silane wherein α is 0 and δ is 1–3, also resulting in a modified inorganic substrate bearing alkyl moieties.

As used herein, the term "polar-modified bonded phase" refers to the modified inorganic substrate modified with at least one polar silane according to the invention, wherein δ is 0–3, β is 1–30, and α is 1, so that the bonded phase provides polar Q moieties such as amido, carbamato, cyanato, ether, etc. as defined above positioned near the surface of the inorganic substrate.

The term "polar embedded phase" refers to a polar modified bonded phase as defined above modified with at least one polar silane, and having alkyl moieties such that the polar Q moieties are "embedded" in the hydrophobic phase formed by the alkyl moieties. The polar silane can be a long chain polar silane or a short chain polar silane, or a combination of the two, so long as both polar and alkyl functionalities are present.

The term "long chain silane" refers to a silane according to the invention wherein δ is 0–3, β is 1–30, and α is 0 or 1, wherein the silane comprises a hydrocarbyl group comprising at least seven carbons.

The term "short chain silane" refers to a silane according to the invention wherein δ is 0–3, β is 1–30, and α is 0 or 1, wherein the silane may comprise a hydrocarbyl group numbering six carbons or less.

The term "hydrocarbyl" refers generally to alkyl moieties, although the term also encompasses alkenyl or alkynyl moieties.

The term "atmosphere having a defined relative humidity" refers to a controlled and constant relative humidity such as that provided over solutions of saturated salt solutions or hydrated salts. Customarily, samples can be equilibrated over saturated salt solutions or hydrated salts maintained in sealed containers such as desiccators.

The term "equilibration" as used herein refers to the steady state condition where no additional change occurs. Equilibrating the inorganic substrate in an atmosphere of defined relative humidity typically requires days or weeks to reach steady state or equilibrium, wherein the amount of water on the surface of the inorganic substrate is constant. Equilibration in an atmosphere of relatively high relative humidity results in a greater amount of surface bound water on the inorganic substrate. Conversely, equilibration in an atmosphere of relatively low relative humidity results in a lesser amount of surface bound water on the inorganic substrate.

The term "chiral recognition ligand" refers to a moiety having a chiral or optical activity that is able to preferentially interact with one enantiomer of an analyte over the other enantiomer of an analyte.

As used herein, the terms "asymmetry" or "peak asymmetry" refer to a factor describing the shapes of chromatographic peaks, defined as the ratio of the distance between the peak apex and the back side of the chromatographic curve and the front side of the curve at 10% peak height.

The present invention discloses next generation bonded phases and methods for preparation utilizing a surface modification procedure in which one or more silanes are reacted with an inorganic substrate to provide a superior chromatographic sorbent with minimal residual anion exchange activity, such as silanol activity. The present invention provides improved methods for preparing these bonded phases, providing maximal coverage with covalently bound silanes. The absence of anion exchange activity is an important advance in these next generation materials. The bonded phases also exhibit markedly improved stability to base and acid treatment, long life, and reproducible chromatographic performance.

The present invention also provides useful silanes for preparing modified alkyl and polar bonded phases. Silanes are disclosed having desired substituents that can then be bonded to the inorganic substrate surface in a single reaction step having advantages over the two-step modification process. Two or more different silanes can also be advantageously bonded to the inorganic substrate, and can be bonded in a single reaction or in sequential reactions.

The methods of preparing these next generation stationary phases exhibit many advantages over the previously known stationary phases: (1) the stationary phases maintain a reversed-phase character, (2) the phases provide a different selectivity compared with classical alkyl phases, (3) polar analytes that are insufficiently retained on a conventional alkyl column interact with the polar groups in these new phases, producing enhanced retention, (4) the polar groups aid the retention of polar compounds by keeping the stationary phase completely wetted, even in 100% aqueous mobile phases, (5) silanol activity is suppressed, which leads to better peak shape and decreased tailing of basic compounds particularly at intermediate pH values, (6) these phases also are compatible with highly organic mobile phases. The ability to cover the full range of mobile phase composition, from 100% aqueous to 100% organic, is useful for developing gradient methods for analyzing sample containing both highly polar and nonpolar analytes.

The modified inorganic substrates used in the present improved stationary phases and methods of preparing them are disclosed further below.

II. Silanes

The silanes used in the preparation of the compositions of the present invention can be prepared by conventional synthetic methods, for example, hydrolysis of epoxides, reaction of an amine with an acyl chloride, and addition of alcohol or amine to a carbon-nitrogen double bond. For example, O-alkyl-N-(trialkoxysilylalkyl)urethanes can be prepared as described in U.S. Pat. No. 6,071,410 to Nau et al. Additional polar silanes are described in U.S. Pat. No. 6,645,378 to Liu et al. and U.S. Pat. No. 5,374,755 to Neue et al. Silanes having a polar moiety such as Q described below can be synthesized by one skilled in the art of organic synthesis. Polar silanes can be easily prepared by reaction of the appropriate allyl ether, amide, carbamide, etc., with dimethylethoxysilane to yield the dimethylethoxysilane having the desired $R^1_\delta$-$Q_\alpha$($CH_2$)$_\beta$ component.

In one embodiment, a silane is provided for modifying an inorganic substrate having the formula

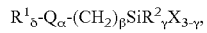

wherein $R^1$ is hydrogen, $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; $\alpha$ is 0 or 1; $\beta$ is 0–30; $\gamma$ is 0, 1 or 2; $\delta$ is 0–3; $R^2$ is $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; Q is independently selected from —NHC(O)—, —C(O)NH—, —OC(O)NH—, —NHC(O)O—, —NHC(O)NH—, —NCO, —CHOHCHOH—, $CH_2OCHCH_2O$—, —($CH_2CH_2O$)$_n$—, —($CH_2CH_2CH_2O$)$_n$—, —C(O)—, —C(O)O—, —OC(O)—, $CH_3C(O)CH_2$—, —S—, —SS—, —CHOH—, —O—, —SO—, —SO$_2$—, —SO$_3$—, —OSO$_3$—, —SO$_2$NH—, —SO$_2$NMe—, —NH—, —NMe—, —NMe$_2^+$—, —N[($CH_2$)$_n$]$_2^+$—, —CN, —NC, —CHOCH—, —NHC(NH)NH—, —NO$_2$, —NO, —OPO$_3$—, where n is 1–30; and X is a leaving group. Preferably, $\alpha$ is 1 for at least one of the silanes used to prepare the bonded phase. Preferably Q is —NHC(O)—, —C(O)NH—, —OC(O)NH—, —NHC(O)O—, —NHC(O)NH—, —NCO, —CHOHCHOH—, —C(O)—, —C(O)O-, —OC(O)—, $CH_3C(O)CH_2$—, —CHOH—, —O—, —SO—, —SO$_2$—, —SO$_3$—, —OSO$_3$—, —SO$_2$NH—, —SO$_2$NMe—, —NH—, —NMe—, —NMe$_2^+$—, —N[($CH_2$)$_n$]$_2^+$—, —CN, —NC, —CHOCH—, or —NHC(NH)NH—. In other embodiments, Q is —($CH_2CH_2O$)$_n$—, —($CH_2CH_2CH_2O$)$_n$—, —S—, —SS—, —NO$_2$, —NO, or —OPO$_3$—.

III. Alkyl and Polar Bonded Phases

The present work relates to the discovery that bonding short chain polar silanes along with bonding of longer alkyl chains such as $C_8$–$C_{18}$ is a successful development approach for stationary phases that can retain polar analytes reproducibly under highly aqueous conditions. Bonding of the short chain polar or hydrophilic silanes allows the silica surface to be wetted with water and allows the full interaction with the longer alkyl chains. The bonding and endcapping process to prepare this type of reversed phase packing minimally is a two-step process. In one embodiment, in the first step, at least one long chain silane (for example, $C_8$ or $C_{18}$), which can be an alkyl silane or a polar modified silane, or a mixture thereof, is bonded to an inorganic substrate such as silica. A second bonding step uses a short chain silane or an endcapping reagent. An endcapping reaction can be performed after the two initial bonding steps as well. Table 1 presents exemplary silanes used to prepare the bonded phases described herein.

TABLE 1

Phases in Examples 3–11

| phase | long chain silane | short chain silane |
|---|---|---|
| 1 | $C_{15}H_{31}CONH(CH_2)_3Si(OMe)_3$ | $CH_3CONH(CH_2)_3Si(OMe)_3$ |
| 2 | $C_8H_{17}OCONH(CH_2)_3Si(OEt)_3$ | $CH_3CONH(CH_2)_3Si(OMe)_3$ |
| 3 | $C_{15}H_{31}CONH(CH_2)_3Si(OMe)_3$ | none |
| 4 | $C_{18}H_{37}SiCl_3$ | $CH_2OCHCH_2O(CH_2)_3Si(OMe)_3$ |
| 5 | $C_8H_{17}SiCl_3$ | $CH_2OCHCH_2O(CH_2)_3Si(OMe)_3$ |

TABLE 1-continued

Phases in Examples 3–11

| phase | long chain silane | short chain silane |
|---|---|---|
| 6 | $C_{18}H_{37}SiCl_3$ | $NC(CH_2)_3SiMe_2Cl$ |
| 7 | $C_8H_{17}SiCl_3$ | $NC(CH_2)_3SiMe_2Cl$ |
| 8 | $C_{18}H_{37}SiCl_3$ | $CH_3CONH(CH_2)_3Si(OMe)_3$ |
| 9 | $C_8H_{17}SiCl_3$ | $CH_3CONH(CH_2)_3Si(OMe)_3$ |
| C18 | $C_{18}H_{37}SiMe_2Cl$ | none |

Polar or hydrophilic short chain silanes can be hydrolyzed after bonding to produce silanol groups. These silanol groups near the surface provide a high degree of polar character to the final alkyl bonded phase, but they have a lower acidity than residual silanols found on the surface of bonded silica substrates, resulting in less retention and tailing of silanophilic analytes.

In another embodiment, in the first step, at least one long chain alkylsilane or polar modified silane is bonded to the inorganic substrate. A second bonding step is performed using a short chain polar modified silane, optionally followed by a third bonding step using an endcapping reagent.

Accordingly, the invention provides a composition for use as a stationary phase in chromatography comprising an inorganic substrate that is modified with at least one silane having the formula

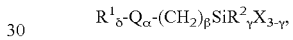

wherein $R^1$ is hydrogen, $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; $\alpha$ is 0 or 1; $\beta$ is 0–30; $\gamma$ is 0, 1 or 2; $\delta$ is 0–3; $R^2$ is $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; Q is independently selected from —NHC(O)—, —C(O)NH—, —OC(O)NH—, —NHC(O)O—, —NHC(O)NH—, —NCO, —CHOHCHOH—, $CH_2OCHCH_2O$—, —($CH_2CH_2O$)$_n$—, —($CH_2CH_2CH_2O$)$_n$—, —C(O)—, —C(O)O—, —OC(O)—, $CH_3C(O)CH_2$—, —S—, —SS—, —CHOH—, —O—, —SO—, —SO$_2$—, —SO$_3$—, —OSO$_3$—, —SO$_2$NH—, —SO$_2$NMe—, —NH—, —NMe—, —NMe$_2^+$—, —N[($CH_2$)$_n$]$_2^+$—, —CN, —NC, —CHOCH—, —NHC(NH)NH—, —NO$_2$, —NO, —OPO$_3$—, where n is 1–30; and X is a leaving group.

The desired hydrophobicity and polarity of the stationary phase can be adjusted by choice of $R^1$, $R^2$, $\beta$, and Q. In a preferred embodiment, the inorganic substrate is silica gel and is modified with at least two silanes. In one embodiment, the silica gel substrate is modified with a first silane, and subsequently the silica gel substrate is modified with a second silane. In another embodiment, the first or second silane or both the first and the second silanes comprises a mixture of silanes.

In certain preferred embodiments, the silica gel substrate is modified with at least one silane wherein $\delta$ is from 0–3, and one silane wherein $\delta$ is 0 or 1. In certain other embodiments, the silica gel substrate is modified with at least two silanes wherein $\delta$ is from 0–3.

In particular embodiments, the silica gel substrate is modified with a first silane, and subsequently modified with a second silane. The first silane has a value for δ of from 1–3, and the second silane has a value for δ of from 0–3.

In another embodiment, the first silane has a value for δ of 1, α is 1, β is 1–30, γ is 0, 1, or 2, $R^1$ is a substituted or unsubstituted $C_1$–$C_{30}$ hydrocarbyl, Q is amido or carbamyl, and the second silane has a value for δ of 1, α is 1, β is 1–30, γ is 0, 1, or 2, $R^1$ is a substituted or unsubstituted $C_1$–$C_6$ hydrocarbyl, and Q is amido, carbamyl, cyano or glycidoxy.

In other embodiments, the first silane has a value for δ of 1, α is 1, β is 1–30, γ is 0, 1 or 2, $R^1$ is a substituted or unsubstituted $C_1$–$C_{30}$ hydrocarbyl, Q is carbamato or urethane, and the second silane has a value for δ of 1, α is 1, β is 1–30, γ is 0, 1 or 2, $R^1$ is a substituted or unsubstituted $C_1$–$C_6$ hydrocarbyl, and Q is amido, carbamyl, cyano or glycidoxy.

In another embodiment, the first silane has a value for δ of 1, α is 1, β is 1–30, γ is 0, 1, or 2, $R^1$ is a substituted or unsubstituted $C_1$–$C_{30}$ hydrocarbyl, Q is amido, carbamate, urethane or carbamyl, and the second silane has a value for δ of 1, α is 1, β is 1–30, γ is 0, 1, or 2, $R^1$ is a substituted or unsubstituted $C_1$–$C_6$ hydrocarbyl, and Q is isocyanato, diol, ethoxy, propoxy, carbonyl, carboxy, or acetonyl.

In other embodiments, the first silane has a value for δ of 1, α is 1, β is 1–30, γ is 0, 1 or 2, $R^1$ is a substituted or unsubstituted $C_1$–$C_{30}$ hydrocarbyl, Q is amido, carbamate, urethane or carbamyl, and the second silane has a value for δ of 1, α is 1, β is 1–30, β is 0, 1 or 2, $R^1$ is a substituted or unsubstituted $C_1$–$C_6$ hydrocarbyl, and Q is thio, dithio, ether, sulfinyl, sulfonyl, sulfonic acid, sulfate, sulfonamido, amino, nitrile, isonitrile, epoxy, guanidino, nitro, nitroso, or phosphate.

In yet other embodiments, the first silane has a value for δ of 1, α is 1, β is 1–30, γ is 0, 1, or 2, $R^1$ is a substituted or unsubstituted $C_1$–$C_{30}$ hydrocarbyl, Q is amido or carbamyl, and the second silane has a value for δ of 0, 1, 2 or 3, α is 0, β is 0–30, γ is 0, 1, or 2, and $R^1$ is H or a substituted or unsubstituted $C_1$–$C_6$ hydrocarbyl.

In another embodiment, the first silane has a value for δ of 1, $R^1$ is a substituted or unsubstituted $C_1$–$C_{30}$ hydrocarbyl, Q is amido, and the second silane has a value for δ of 1, $R^1$ is a substituted or unsubstituted $C_1$–$C_6$ hydrocarbyl, and Q is amido, cyano or glycidoxy.

In other embodiments, the first silane has a value for δ of 1, α is 0, β is 8–30, γ is 0, 1 or 2, $R^1$ is H, and the second silane has a value for δ of 1, $R^1$ is a substituted or unsubstituted $C_1$–$C_6$ hydrocarbyl, and Q is amido, cyano or glycidoxy.

In another embodiment, the first silane has a value for δ of 1, α is 0, β is 8–30, γ is 0, 1 or 2, $R^1$ is H, and the second silane has a value for δ of 1, $R^1$ is a substituted or unsubstituted $C_1$–$C_6$ hydrocarbyl, and Q is isocyanato, diol, ethoxy, propoxy, carbonyl, carboxy, or acetonyl.

In another embodiment, the first silane has a value for δ of 1, α is 0, β is 8–30, γ is 0, 1 or 2, $R^1$ is H, and the second silane has a value for δ of 1, $R^1$ is a substituted or unsubstituted $C_1$–$C_6$ hydrocarbyl, and Q is thio, dithio, ether, sulfinyl, sulfonyl, sulfonic acid, sulfate, sulfonamido, amino, nitrile, isonitrile, epoxy, guanidino, nitro, nitroso, or phosphate.

In still another embodiment, the first silane has a value for δ of 1, α is 0, β is 8–30, $R^1$ is H, γ is 0, 1 or 2, and the second silane has a value for δ of 0 or 1, β is 1–30, α is 0 or 1, $R^1$ if present is H or substituted or unsubstituted $C_1$–$C_6$ hydrocarbyl, and Q is amido, cyano or glycidoxy.

One skilled in the art will recognize that the above embodiments are merely exemplary, and additional combinations of silanes and endcapping reagents are encompassed within the compositions and methods disclosed herein.

In yet other embodiments, the silica gel substrate is further modified with at least one additional silane, such as an endcapping silane. Preferably, the endcapping silane is a monosilane, disilane, trisilane or tetrasilane, or a combination thereof. Monosilanes useful for endcapping include, for example, trimethylchlorosilane, N,N-dimethyltrimethylsilylamine, trimethylsilylimidazole, dimethyldichlorosilane, dimethoxydimethylsilane, trimethylsilanol, trimethylsilylphosphine, or N-trimethylsilylacetamide. Disilanes useful for endcapping include, for example, hexamethyldisilazane or 1,3-dimethoxytetramethyldisiloxane. Trisilanes useful for endcapping include, for example, hexamethylcyclotrisiloxane. Tetrasilanes useful for endcapping include, for example, octamethylcyclotetrasiloxane.

In other aspects, the invention provides a chromatography column for liquid or gas chromatography wherein the stationary phase comprises a modified inorganic substrate as described above. In other aspects, the modified bonded phases can be used in microfluidics applications, as discussed further below.

IV. Preparation of Alkyl and Polar Modified Bonded Phases

Methods are disclosed for modifying an inorganic substrate, comprising the steps of
(a) equilibrating the inorganic substrate in an atmosphere having a defined relative humidity;
(b) modifying the inorganic substrate with at least one silane; and
(c) further modifying the inorganic substrate with an endcapping silane.

Preferably the at least one silane has the formula:

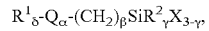

$$R^1{}_\delta\text{-}Q_\alpha\text{-}(CH_2)_\beta SiR^2{}_\gamma X_{3-\gamma},$$

wherein $R^1$ is hydrogen, $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; α is 0 or 1; β is 0–30; γ is 0, 1 or 2; δ is 0–3; $R^2$ is $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; Q is independently selected from —NHC(O)—, —C(O)NH—, —OC(O)NH—, —NHC(O)O—, —NHC(O)NH—, —NCO, —CHOHCHOH—, $CH_2OCHCH_2O$—, —$(CH_2CH_2O)_n$—, —$(CH_2CH_2CH_2O)_n$—, —C(O)—, —C(O)O—, —OC(O)—, $CH_3C(O)CH_2$—, —S—, —SS—, —CHOH—, —O—, —SO—, —$SO_2$—, —$SO_3$—, —$OSO_3$—, —$SO_2NH$—, —$SO_2NMe$—, —NH—, —NMe—, —$NMe_2{}^+$—, —$N[(CH_2)_n]_2{}^+$—, —CN, —NC, —CHOCH—, —NHC(NH)NH—, —$NO_2$, —NO, —$OPO_3$—, where n is 1–30; and X is a leaving group.

In particular embodiments, the method further comprises the step of modifying the inorganic substrate with a second silane, wherein δ for the second silane is from 0–3. In additional embodiments, δ for the second silane is 0 or 1. In certain other embodiments, δ for the second silane is 1 and $R^1$ for the second silane is a $C_1$–$C_6$ hydrocarbyl. In particular embodiments, the modification step with the second silane is performed at the same time as the modification step with the first silane, while in yet other embodiments, the modification step with the second silane is performed after the modification step with the first silane.

FIG. 1 schematically illustrates exemplary reactions for the synthesis of polar-modified bonded phases. The first step in the production of the bonded phase is the reaction of porous silica gel with a long-chain silane followed by reaction with a short-chain polar silane. Despite the fact that two silylation reactions have taken place, a few reactable silanols may still remain on the surface of silica gel. Therefore, an endcapping reaction can be performed to convert any undesirable residual silanols to less adsorptive trimethylsilyl groups. This is preferably done by contacting the bonded silica with an excess of endcapping reagents. This should be done for a sufficient period of time to assure complete treatment of the accessible remaining silanols.

Figure 2:
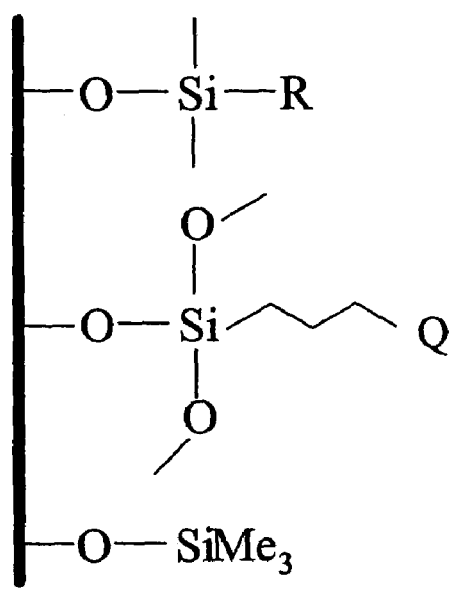
FIG. 2 schematically illustrates the structures of polar-modified stationary phases.
Figure 2:
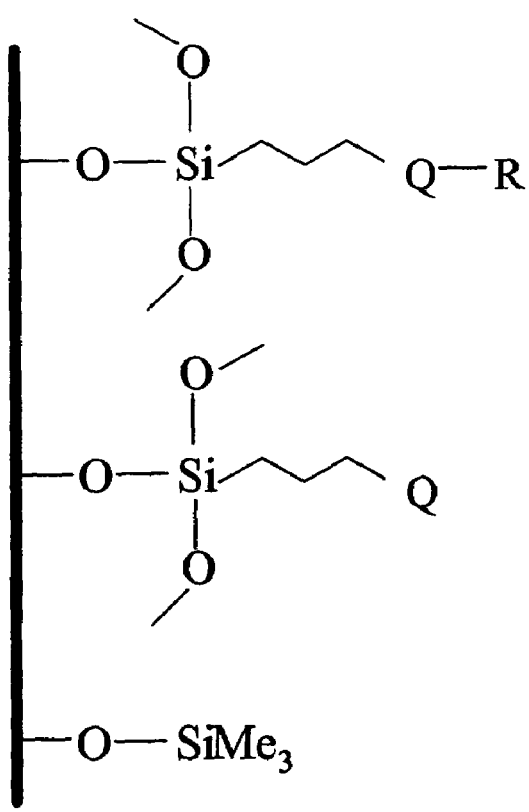
Figure 3A:
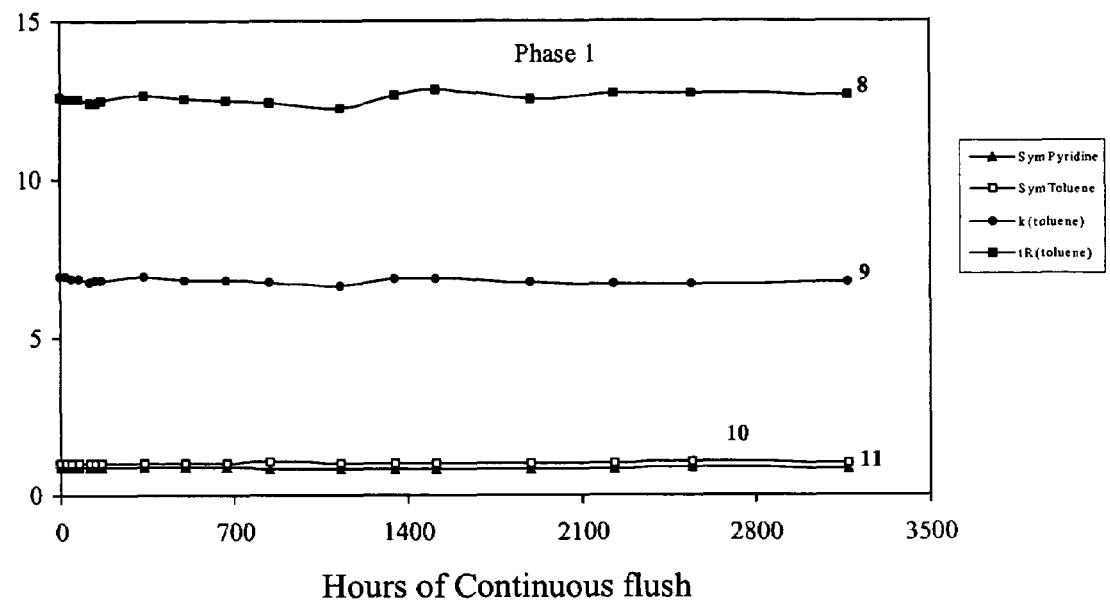
FIGS. 3A–D show the effect of pH 1.5 on the stability of polar-modified bonded phases.
Figure 3A:
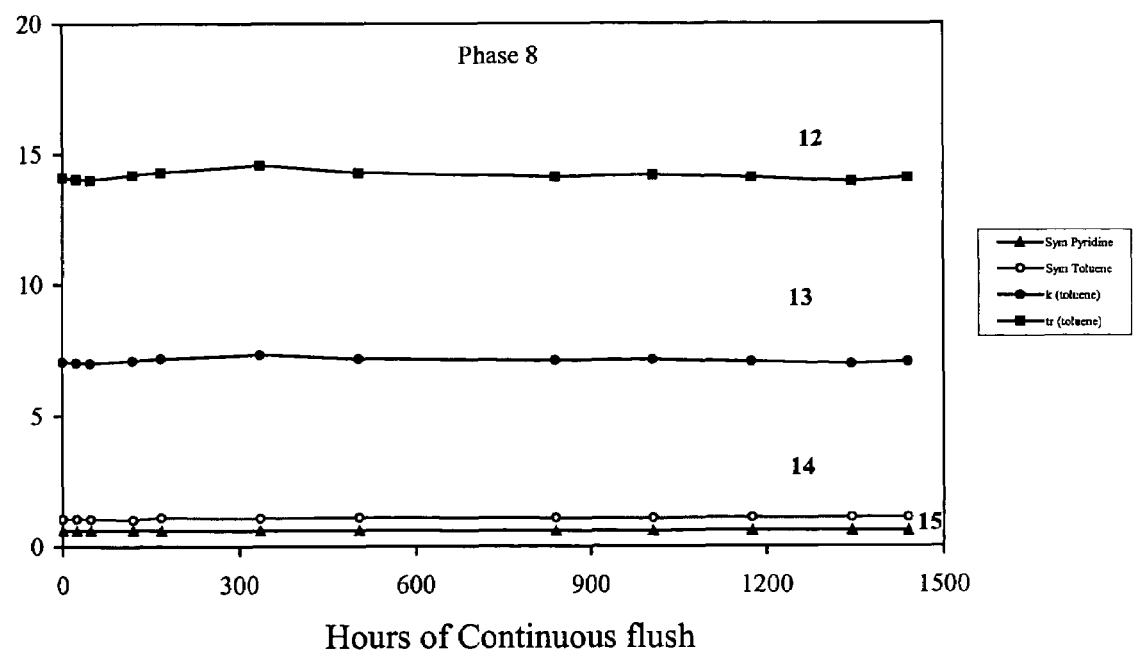
Figure 3B:
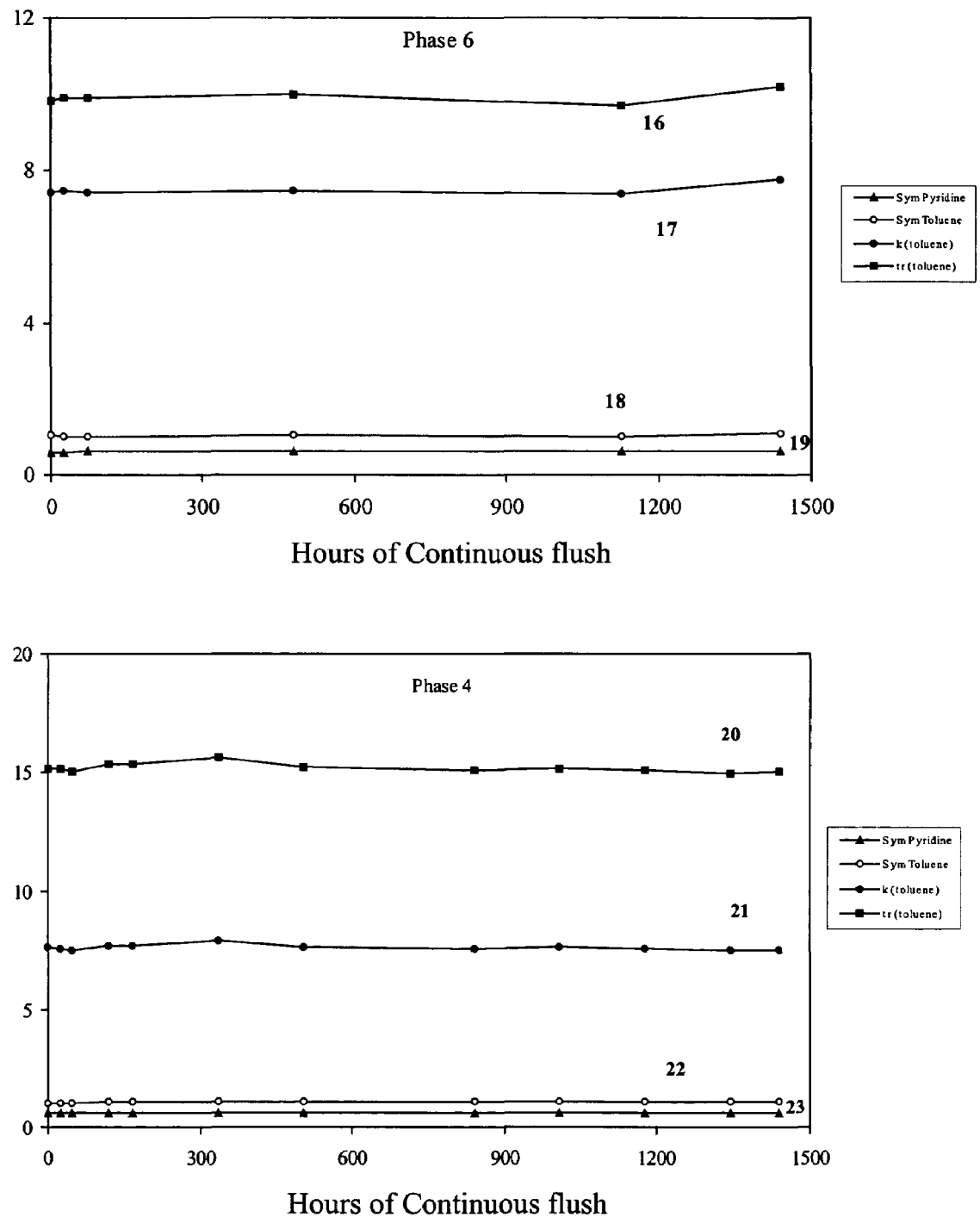
Figure 3C:
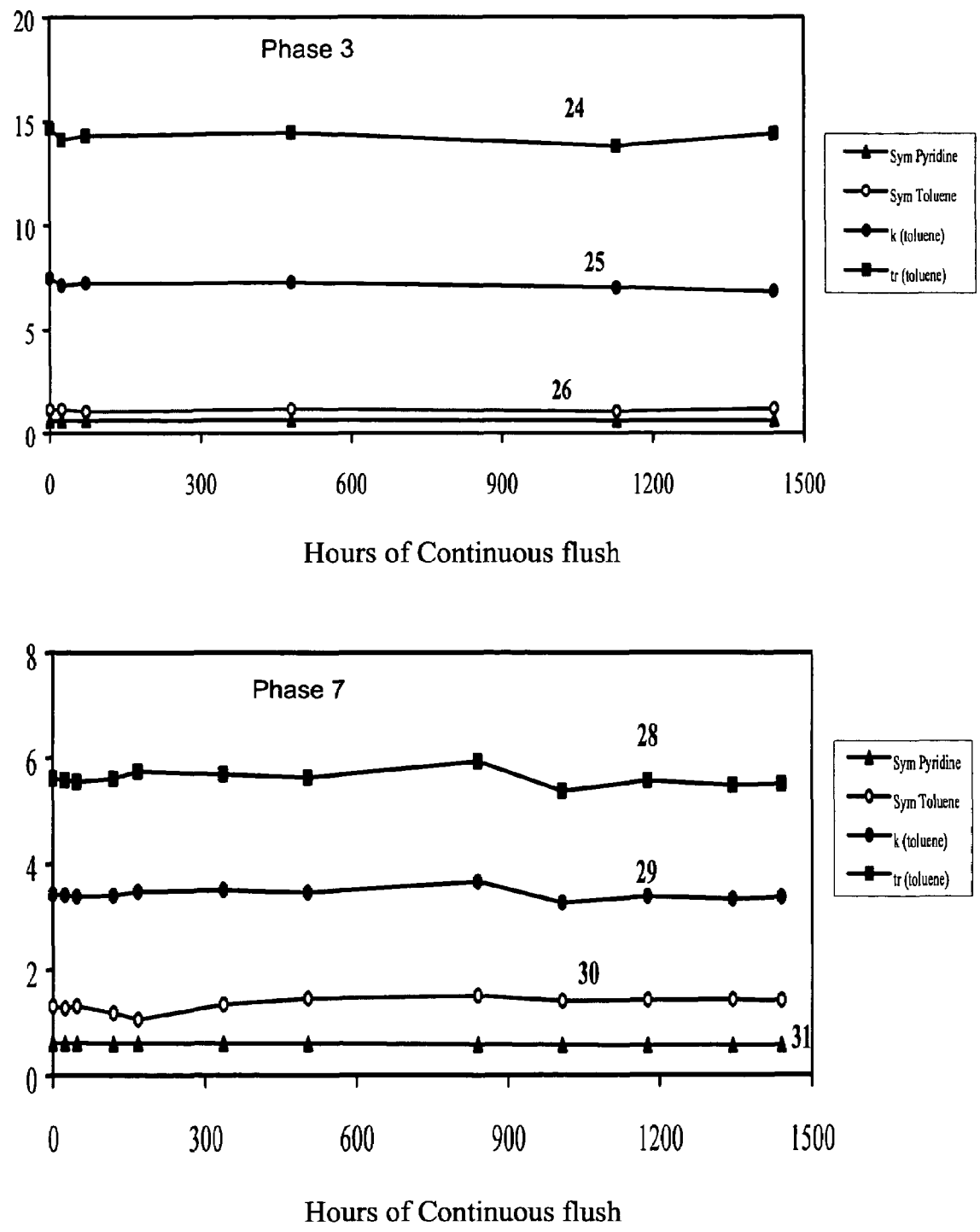
Figure 3D:
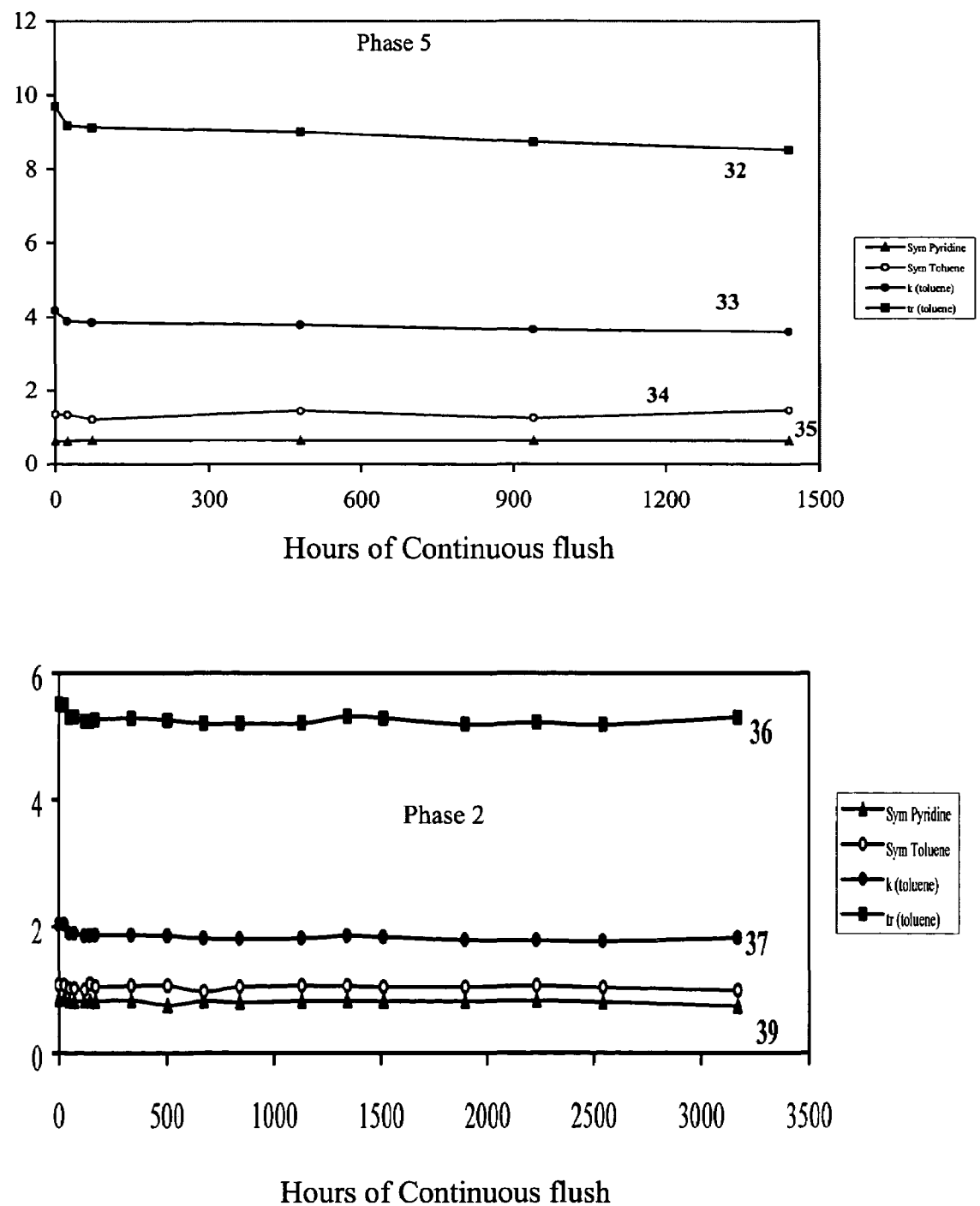
Figure 4A:
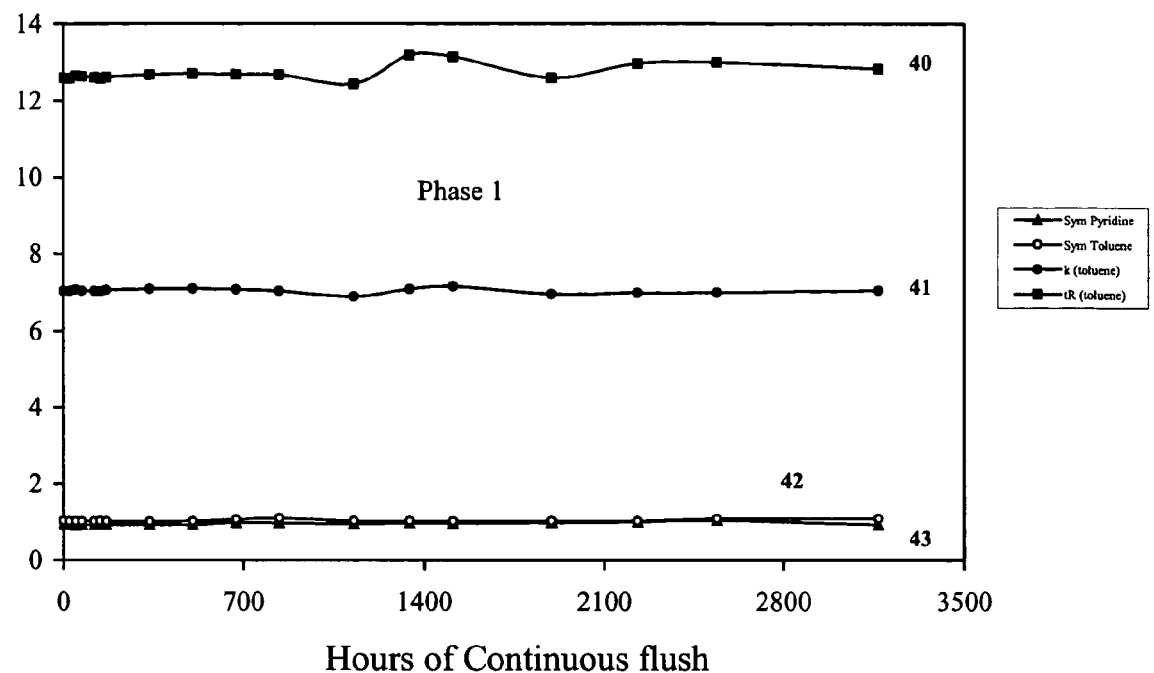
FIGS. 4A–D show the effect of pH 10.0 on the stability of polar-modified bonded phases.
Figure 4A:
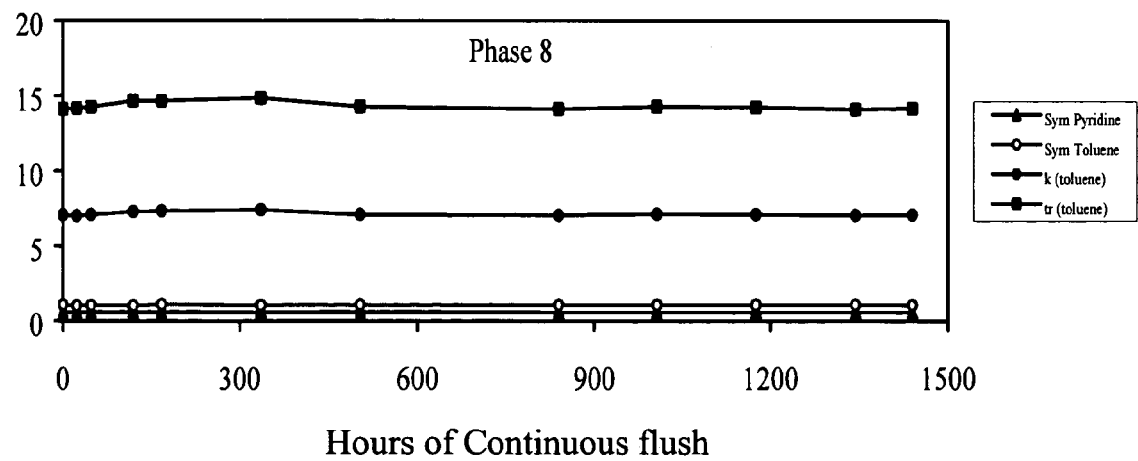
Figure 4B:
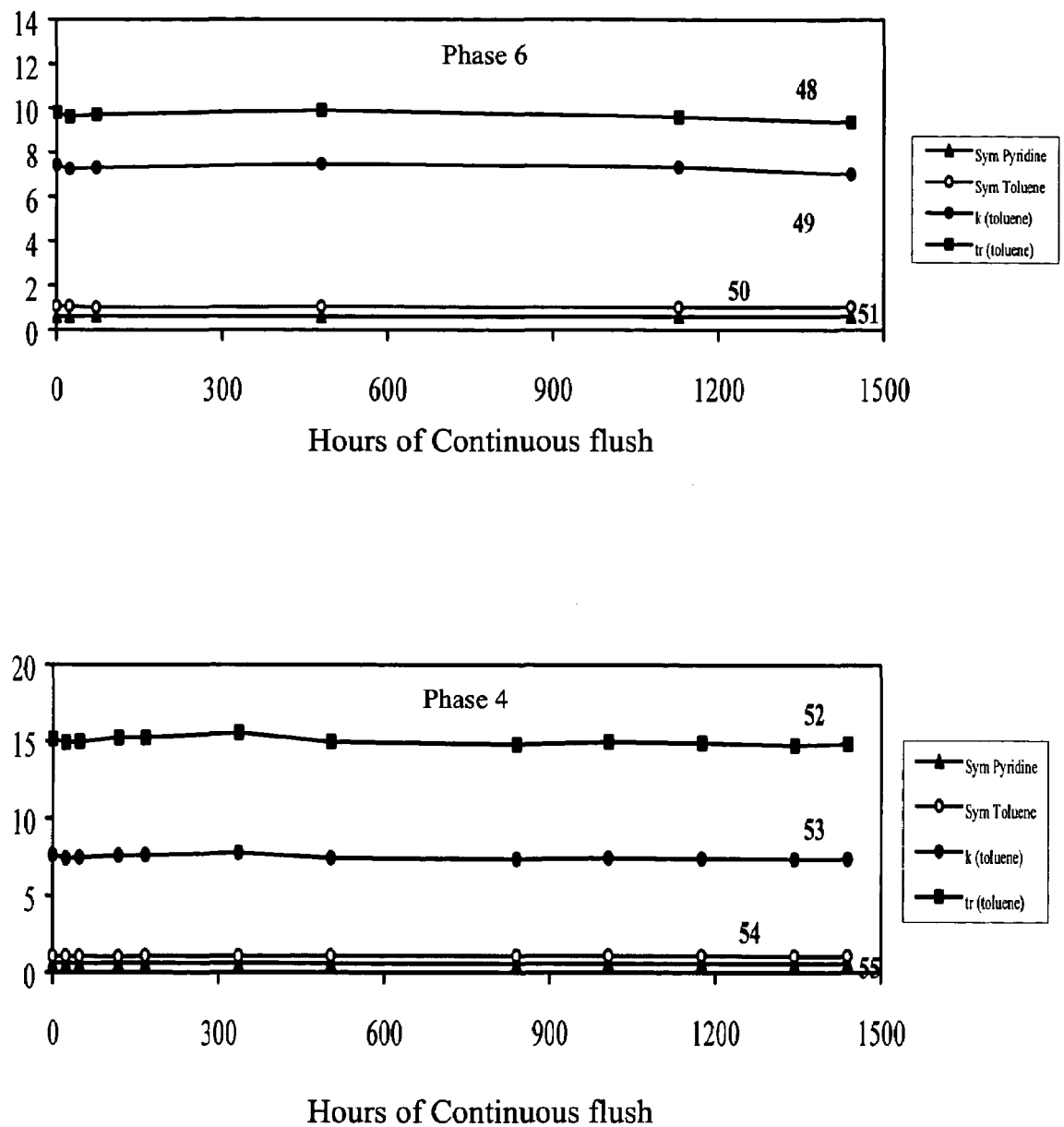
Figure 4C:
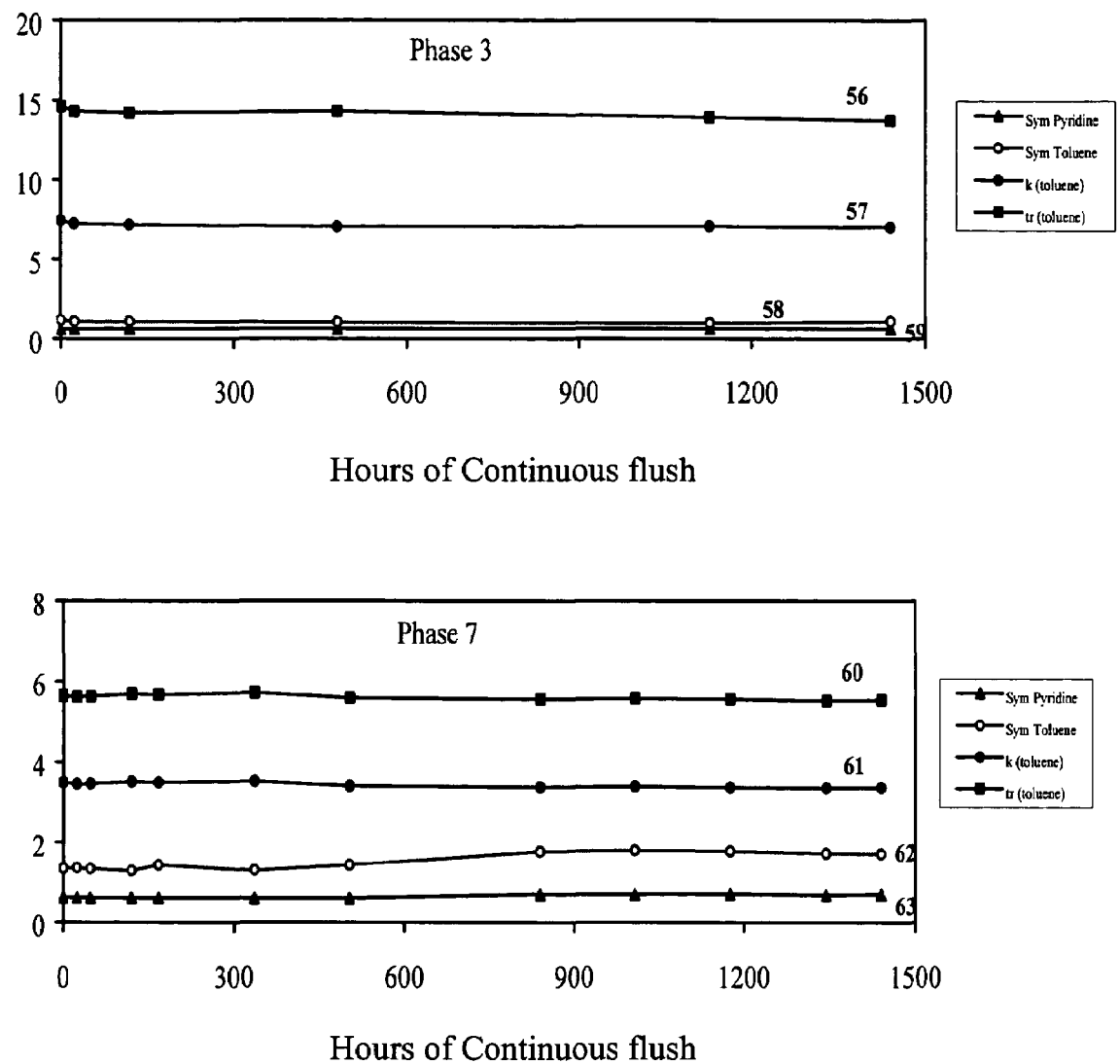
Figure 4D:
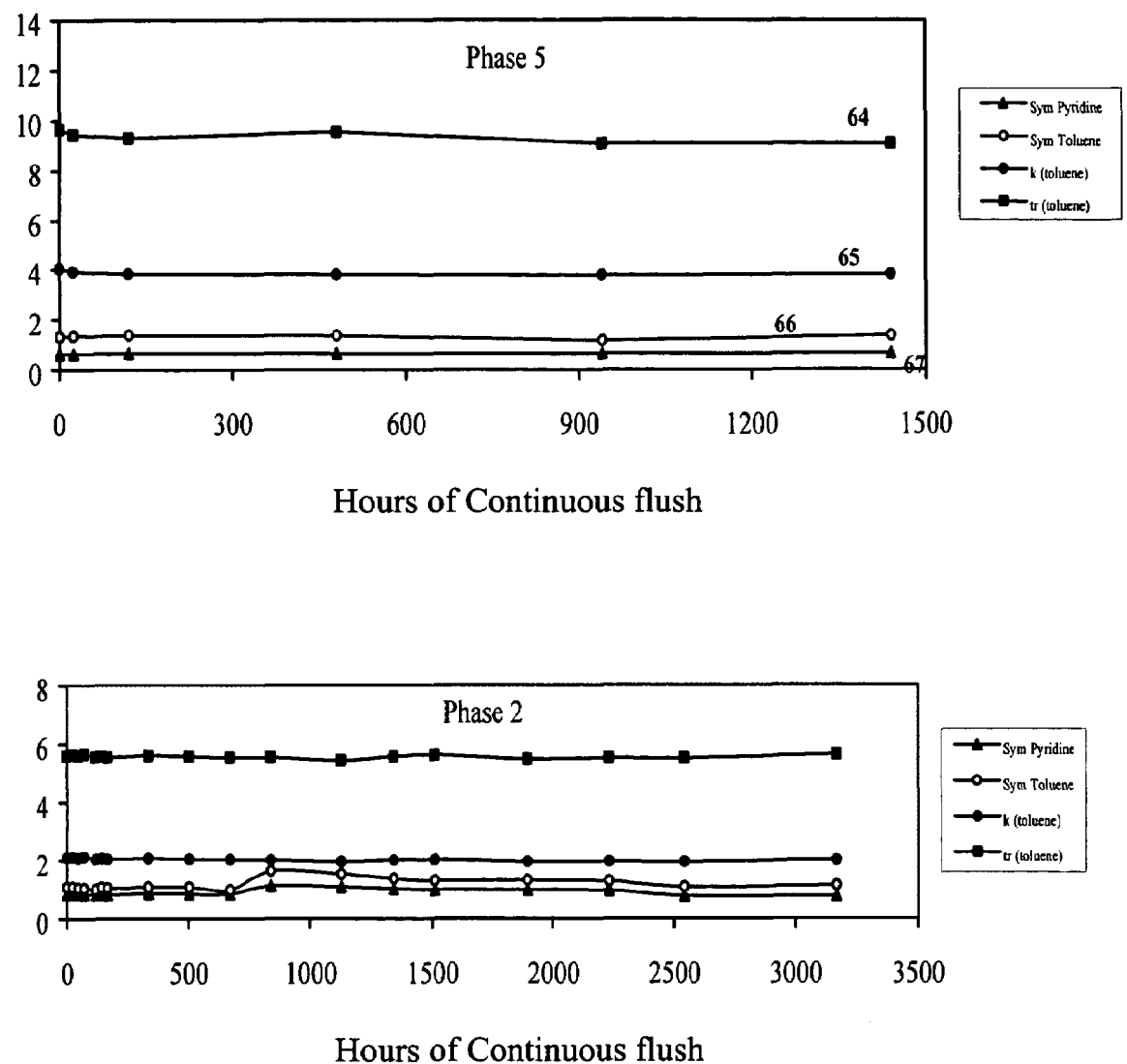

FIG. 2 schematically represents the structures of polar-modified bonded phases in which a long-chain and a short-chain silane ligands modify about half of the surface silanols of silica gel. Residual surface silanols were endcapped with an appropriate endcapping reagent such as trimethylchlorosilane.

Preferably, the modification is performed in the presence of an inert solvent such as toluene or xylene, and a scavenger, such as pyridine, triethylamine, imidazole or N,N-dimethylbutylamine, or combinations thereof. Preferably, the reaction temperature for performing the modification of the silica gel substrate is the reflux temperature of the inert solvent.

In preferred embodiments, the inorganic substrate is a silica gel substrate, and is modified by the following steps:
  (a) equilibrating the silica gel substrate in an atmosphere having a defined relative humidity;
  (b) modifying the silica gel substrate with at least one silane; and
  (c) further modifying the silica gel substrate with an endcapping silane.

In other embodiments, a further modification step is performed after or concurrently with step (b) using a second silane. In certain embodiments, δ for the second silane is 1 and $R^1$ for the second silane is $C_1$–$C_6$ hydrocarbyl. In particular embodiments, the modification step with the second silane is performed at the same time as the modification step with the first silane, and in yet other particular embodiments, the modification step with the second silane is performed after the modification step with the first silane.

The amount of silane used in the bonding process is related to the number of silanols on the surface of the silica, and preferably ranges from an equivalent amount to about a five-fold excess. As silica possesses theoretically about 8 micromoles of silanol groups per square meter of surface, this means that from about 8/3 to about 40/3 micromoles of silane per square meter of silica surface (reflecting three reactive chloro or alkoxy groups per silane) is preferred. The amount of silane which ultimately bonds to the silica is not strongly dependent upon the amount of silane added, and preferably the amount of silane in the bonding process is about 50% excess based on the mole number of silanols on the surface of the silica. The trifunctional silylating reagent is allowed to react with the silica surface at levels of from about 2 to about 10 μmole of reagent per square meter of silica surface, preferably from about 3 to about 6 μmole/m². These levels provide adequate shielding of the silica surface from the silanophiles.

V. Substrates

The substrates useful in the invention include inorganic substrates such as metal and metalloid oxides, including for example, titania, zirconia, vanadia, alumina, and silica respectively. Glasses comprising silica and silica composites are also useful. The substrates can also include composite materials such as mullite, zeolite, $CaTiO_3$ (perovskite), $FeTiO_3$ (ilmenite), $Mg_2TiO_4$ (spinel). Inorganic substrates include porous mineral materials, such as silica, alumina, titanium oxide, zirconium oxide and other metal oxides, or mixtures thereof. The inorganic substrate can be present in the form of particles or monoliths, etc., but can also be present as a coating or component of an additional inorganic or organic support material.

Organic supporting materials may be composed of polysaccharides, such as cellulose, starch, dextran, agar or agarose, or hydrophilic synthetic polymers, such as substituted or unsubstituted polyacrylamides, polymethacrylamides, polyacrylates, polymethacrylates, polyvinyl hydrophilic polymers, polystyrene, polysulfone or the like.

Alternatively, composite inorganic and organic materials may be used as a solid support material on which the inorganic substrate is disposed. Such composite materials may be formed by the copolymerization or formation of the organic support materials while in contact with an inorganic support material. Examples of suitable composite materials include polysaccharide-synthetic polymers and/or polysaccharide-mineral structures and/or synthetic polymer-mineral structures, such as are disclosed in U.S. Pat. Nos. 5,268,097, 5,234,991 and 5,075,371.

The inorganic substrate may take the form of beads or regular or irregular particles ranging in size from about 0.01 mm to 10 mm in diameter, fibers (hollow or otherwise) of any size, membranes, flat surfaces ranging in thickness, for example, from about 0.1 mm to about 10 mm thick, and sponge-like materials, such as frits with holes from a few microns to several mm in diameter.

Preferably, the inorganic substrate is a metal-oxide or metalloid oxide, such as silica, alumina, zeolite, mullite, zirconia, vanadia or titania, or mixtures or composites thereof, having reactive metal oxides capable of reacting with an alkoxysilane, aminosilane, hydroxysilane or halosilane. After modification of the inorganic substrate surface with a silane, the silane is covalently attached to the inorganic substrate via an oxygen linkage.

In preferred embodiments, the inorganic substrate is in the form of a monolith or porous particles. Monoliths include glass fibers, optical fibers, capillaries, or nonporous particles, which may be continuous with the substrate surface. Preferably the porous particles have an average pore diameter from about 60 Å to about 1000 Å, and have an average particle size from about 3 μm to about 60 μm.

In a preferred embodiment, the inorganic substrate comprises silica gel particles having an average pore diameter from about 60 Å to about 1000 Å, and an average particle size from about 3 μm to about 60 μm.

VI. Equilibration in an Atmosphere of Constant and Defined Relative Humidity

The bonding processes of the present invention involve covalent attachment of silanes to inorganic substrates such as silica to form a stable bonded stationary phase for liquid or gas phase chromatographic separations. The presence of some water is generally necessary for hydrolysis of some alkoxyl groups of the alkoxy silanes to produce silanols which are then available to react with OH groups on the surface of the inorganic substrate, resulting in polymerization, cross-linking, and bonding to the inorganic substrate surface and development of the bonded phase.

The inorganic substrate used in the bonding process is equilibrated over an atmosphere of constant relative humidity prior to the modification step or steps in order to better control the extent and reproducibility of the reaction of the silane. Maintaining and equilibrating the inorganic substrate with a constant relative humidity is necessary for batch to batch reproducibility and optimal performance of the stationary phase.

The controlled amount of water on the inorganic substrate such as silica is achieved by equilibrating the silica with the water vapor in an atmosphere of constant relative humidity above various saturated salt solutions or hydrated salts. It is convenient to equilibrate the silica at about 11–12% relative humidity over a saturated solution of lithium chloride, but other humidity levels, obtained over solutions of other salts or in other ways, are also feasible. Equilibration time is not critical so long as equilibrium is reached. Time in the range from one to three weeks is generally sufficient. Temperature of equilibration is not critical, though it should vary by no more than about 5° C., and room temperature is generally used. The amount of water on the silica surface should be constant from batch to batch, and preferably be in the range from about 10 to about 40 micromoles per square meter of the silica surface.

Preferably, the atmosphere having a defined relative humidity is provided by hydrated salts or saturated salt solutions, including cesium fluoride, lithium bromide, zinc bromide, potassium hydroxide, sodium hydroxide, lithium chloride, calcium bromide, potassium acetate, potassium fluoride, magnesium chloride, sodium iodide, potassium carbonate, magnesium nitrate, sodium bromide, cobalt chloride, sodium nitrite, potassium iodide, strontium chloride, sodium nitrate, sodium chloride, ammonium chloride, potassium bromide, ammonium sulfate, potassium chloride, strontium nitrate, barium chloride, potassium nitrate, or potassium sulfate. Preferably, the defined relative humidity is less than 50%. In particular embodiments, the relative humidity is from about 0% to about 10%, from about 10% to about 20%, from about 20% to about 30%, from about 40% to about 50%, from about 50% to about 60%, from about 60% to about 70%, from about 70% to about 80%, from about 80% to about 90% or from about 90% to about 100%. In one preferred embodiment, the saturated salt solution is LiCl, which provides an atmosphere of relative humidity about 11% to 12%.

For example, to equilibrate the inorganic substrate in an atmosphere of relative humidity from about 10% to about 20% humidity, a LiCi salt solution, providing a relative humidity of 11.3%, can be used. To equilibrate the inorganic substrate in an atmosphere of relative humidity of from about 20% to about 30%, a potassium acetate solution, providing a relative humidity of 22.5% can be used. To equilibrate the inorganic substrate in an atmosphere of relative humidity of from about 30% to about 40%, a $MgCl_2$ solution, providing a relative humidity of 32.8% can be used. To equilibrate the inorganic substrate in an atmosphere of relative humidity of from about 40% to about 50%, a $K_2CO_3$ solution, providing a relative humidity of 43.2% can be used. To equilibrate the inorganic substrate in an atmosphere of relative humidity of from about 50% to about 60%, a NaBr solution, providing a relative humidity of 57.6% can be used. To equilibrate the inorganic substrate in an atmosphere of relative humidity of from about 60% to about 70%, a KI solution, providing a relative humidity of 68.9% can be used. Similarly, to equilibrate the inorganic substrate in an atmosphere of relative humidity of from about 70% to about 80%, a NaCl solution, providing a relative humidity of 75.3% can be used. To equilibrate the inorganic substrate in an atmosphere of relative humidity of from about 80% to about 90%, an ammonium nitrate solution, providing a relative humidity of 81.0% can be used. Additional salt solutions are available providing additional relative humidity levels for equilibration, and can be selected from the Handbook of Chemistry and Physics, "Table of constant RH Solutions" (Chemical Rubber Co. Press, Cleveland, Ohio).

VII. Chromatographic Performance and Methods of Use

In one aspect, the modified inorganic substrate, when used as a stationary phase for chromatography, exhibits increased stability to acidic and basic conditions. In preferred embodiments, the modified inorganic substrates exhibit no more than about 3% variability in retention time, peak symmetry and retention factor for analytes separated, even when exposed to acidic or basic elution conditions for 1000 hours. Preferably, the retention time, peak symmetry and retention factor for analytes separated on said stationary phase varies by no more than about 5% even when exposed to acidic or basic elution conditions for 3000 hours.

Figure 11A:
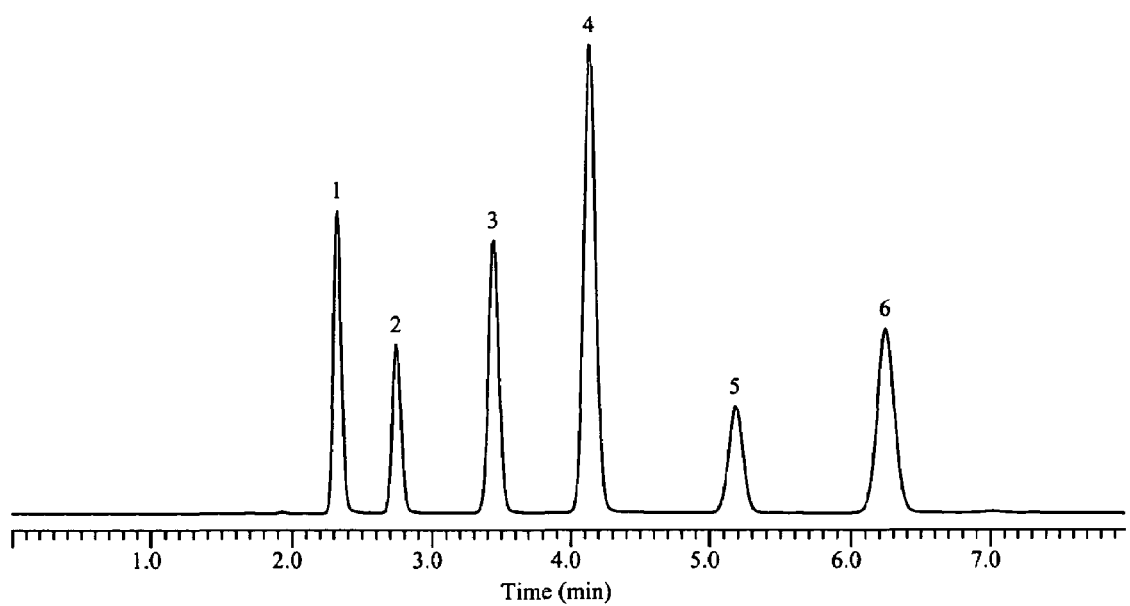
FIGS. 11A–C illustrate the chromatographic separation of aniline homologs, beta-blockers and tricyclic antidepressants on a polar-modified bonded phase.
Figure 11B:
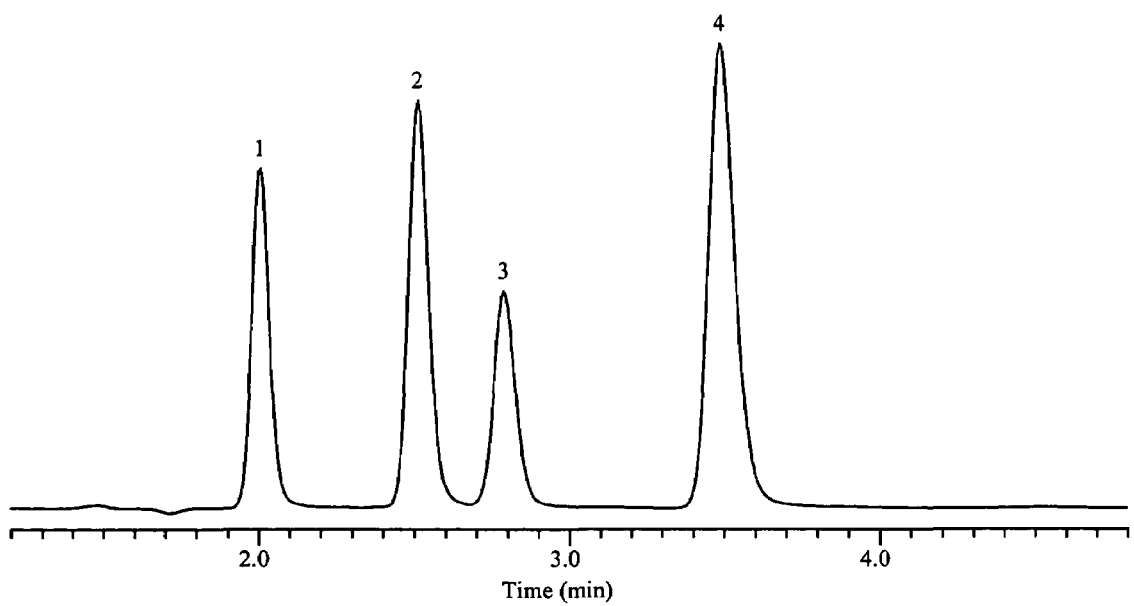
Figure 11C:
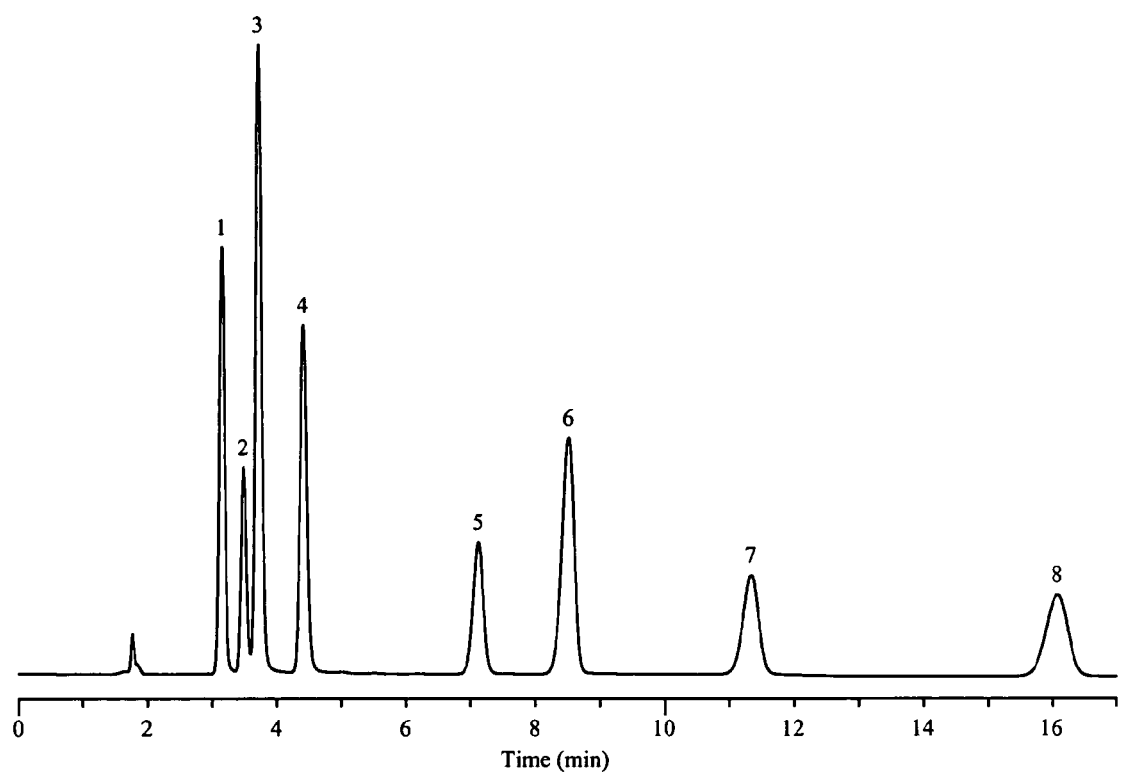

The present methods of preparing alkyl and polar bonded stationary phases for chromatographic applications exhibit marked and dramatic improvement in analysis of basic analytes, with a total absence of tailing and peak asymmetry that is so problematic in other bonded phases. For example, this absence of tailing and superior separation of basic analytes is illustrated in Example 19, describing the separation of the aniline homologs aniline, 2-ethylaniline, N-ethylaniline, N,N-dimethylaniline, N-propylaniline, demonstrated in FIG. 11A. The separation of β-blockers (practolol (peak 1), pindolol (peak 2), bisoprolol (peak 3) and alprenolol (peak 4)) is demonstrated in FIG. 11B. The separation of the tricyclic antidepressants (desmethyl doxepin (peak 1), protriptyline (peak 2), desipramine (peak 3), nortriptyline (peak 4), doxepin (peak 5), imipramine (peak 6), amitriptyline (peak 7) and trimipramine (peak 8)) is demonstrated in FIG. 11C. The column packed with stationary phase 1 shows excellent peak shapes with remarkable selectivity (FIG. 11A–C).

These bonded phases provide superior chromatographic behavior, especially when assessed by residual silanol activity and base deactivation. For example, the ratio of peak asymmetries (As1/As2) for pyridine/phenol reveals an almost undetectable affinity of base relative to alcohol to the bonded phases, superior in comparison to all other bonded phases tested. (See Li, et al., *New Reversed Phase HPLC Columns for Drug Discovery and Pharmaceutical Method Development*, presented at Pittcon 2003).

In comparison with a pure alkyl phase prepared from octadecylsilane ("C18"), the polar modified phases described in the Examples provide superior wettability in highly aqueous solvents, superior stability to acidic or basic mobile phases, good retention of analytes, good hydrophobic selectivity, and good discrimination between analytes based on hydrophobicity and polarity.

The modified inorganic substrate of the present invention can be used as a stationary phase for chromatographic applications, and can be used in a method for separating a plurality of analytes comprising performing a chromatographic separation using a stationary phase comprising an inorganic substrate modified by at least one silane as described above. The chromatographic separation can be performed using a mobile phase that is gaseous or liquid. In one embodiment, the mobile phase comprises from 0 to 100% water. For example, the chromatographic application or separation method can be thin layer chromatography, high performance liquid chromatography, reversed phase chromatography, normal phase chromatography, ion chromatography, ion pair chromatography, reverse phase ion pair chromatography, ion exchange chromatography, affinity chromatography, hydrophobic interaction chromatography, size exclusion chromatography, chiral recognition chromatography, perfusion chromatography, electrochromatography, partition chromatography, microcolumn liquid chromatography, capillary chromatography, liquid-solid chromatography, preparative chromatography, hydrophilic interaction chromatography, supercritical fluid chromatography, precipitation liquid chromatography, bonded phase chromatography, fast liquid chromatography, flash chromatography, liquid chromatography-mass spectrometry, gas chromatography, microfluidics based separations, solid phase extraction separations, or monolith based separations, without limitation.

In a preferred embodiment, the method of the invention provides an improved method of separating analytes using chromatography on a silica gel substrate, the improvement being providing a silica gel substrate modified with at least one silane having the formula

$$R^1_\delta\text{-}Q_\alpha\text{-}(CH_2)_\beta SiR^2_\gamma X_{3-\gamma}$$

wherein $R^1$ is hydrogen, $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; $\alpha$ is 0 or 1; $\beta$ is 0–30; $\gamma$ is 0, 1 or 2; $\delta$ is 0–3; $R^2$ is $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl; Q is —NHC(O)—, —C(O)NH—, —OC(O)NH—, —NHC(O)O—, —NHC(O)NH—, —NCO, —CHOHCHOH—, $CH_2OCHCH_2O$—, —$(CH_2CH_2O)_n$—, —$(CH_2CH_2CH_2O)_n$—, —C(O)—, —C(O)O—, —OC(O)—, $CH_3C(O)CH_2$—, —S—, —SS—, —CHOH—, —O—, —SO—, —$SO_2$—, —$SO_3$—, —$OSO_3$—, —$SO_2NH$—, —$SO_2NMe$—, —NH—, —NMe—, —$NMe_2^+$—, —$N[(CH_2)_n]_2^+$—, —CN, —NC, —CHOCH—, —NHC(NH)NH—, —$NO_2$, —NO, —$OPO_3$—, where n is 1–30; and X is a leaving group; wherein the silica gel substrate is equilibrated in an atmosphere having a defined relative humidity prior to modification with the at least one silane, and wherein the silica gel is modified with at least one silane wherein $\delta$ is from 0–3, at least one silane wherein $\delta$ is 0 or 1, and an endcapping reagent. In a particular embodiment, the silica gel substrate is equilibrated in an atmosphere of 11% relative humidity. Preferably, X is halogen, alkoxy, amino, or acyloxy.

In certain embodiments, Q, $R^1$ or $R^2$ is a chiral recognition ligand. Preferably, the chiral recognition ligand is optically active, and comprises a chiral compound, including lipids, amino acids, peptides, sugars, hydroxy substituted amines, or hydroxy substituted acids. In certain embodiments, the chiral recognition ligand is a heterocycloalkyl moiety or linked heterocycloalkyl moiety such as a cyclodextrin.

VIII. Capillary Chromatography and Microfluidics Applications

The miniaturization of liquid separation techniques to the nano-scale involves small column internal diameters (<100 micron i.d.) and low mobile phase flow rates (<300 nL/min). Techniques such as capillary chromatography, capillary zone electrophoresis (CZE), nano-LC, open tubular liquid chromatography (OTLC), and capillary electrochromatography (CEC) offer numerous advantages over conventional scale high performance liquid chromatography (HPLC). These advantages include higher separation efficiencies, high-speed separations, analysis of low volume samples, and the coupling of 2-dimensional techniques.

Modification of inorganic substrates by silanes as described herein can provide superior chromatographic performance in these applications as well. For example, fused silica capillary tubing can be used as a stationary phase and modified with at least one silane as described above and used in capillary chromatography or capillary zone electrophoresus applications, for example. Fused silica tubing of dimensions 360 micron OD×250 micron ID (Polymicro Technologies, Phoenix, Ariz.) is suitable for preparing silane modified silica capillary tubing for microchromatographic or microfluidics applications.

Capillary electrochromatography is a hybrid technique that utilizes the electrically driven flow characteristics of electrophoretic separation methods within capillary columns packed with a solid stationary phase typical of liquid chromatography. It couples the separation power of reversed-phase liquid chromatography with the high efficiencies of capillary electrophoresis. Higher efficiencies are obtainable for capillary electrochromatography separations over liquid chromatography, because the flow profile resulting from electroosmotic flow is flat due to the reduction in frictional drag along the walls of the separation channel when compared to the parabolic flow profile resulting from pressure driven flows. Furthermore, smaller particle sizes can be used in capillary electrochromatography than in liquid chromatography, because no backpressure is generated by electroosmotic flow. Capillary electrochromatography is capable of separating neutral molecules due to analyte partitioning between the stationary and mobile phases of the column particles using a liquid chromatography separation mechanism.

Microchip-based separation devices have been developed for rapid analysis of large numbers of samples. Compared to other conventional separation devices, these microchip-based separation devices have higher sample throughput, reduced sample and reagent consumption, and reduced chemical waste. The liquid flow rates for microchip-based separation devices range from approximately 1–300 nanoliters per minute for most applications. Examples of microchip-based separation devices include those for capillary electrophoresis, capillary electrochromatography and high-performance liquid chromatography. Such separation devices are capable of fast analyses and provide improved precision and reliability compared to other conventional analytical instruments.

Monolithic support structures (or posts) can be etched in a glass substrate using reactive ion etching techniques. Etching techniques are available to create glass substrate features in the range of 5 to 20 microns. Porous or nonporous particles can also be incorporated into microfluidics designs, providing particles within microchannels on microchip-based separation devices. Both porous and nonporous particles and monolithic structures can be advantageously modified using the silanes as described herein for use in microfluidics applications.

It is to be understood that while the invention has been described in conjunction with the preferred specific embodiments thereof, that the description above as well as the examples that follow are intended to illustrate and not limit the scope of the invention. The practice of the present invention will employ, unless otherwise indicated, conventional techniques of organic chemistry, polymer chemistry, biochemistry and the like, which are within the skill of the art. Other aspects, advantages and modifications within the scope of the invention will be apparent to those skilled in the art to which the invention pertains. Such techniques are explained fully in the literature.

In the following examples, efforts have been made to ensure accuracy with respect to numbers used (e.g., amounts, temperature, etc.) but some experimental error and deviation should be accounted for. Unless indicated otherwise, temperature is in degrees ° C. and pressure is at or near atmospheric. All organic solvents were obtained from J. T. Baker (Phillipsburg, N.J., USA). Organic silane reagents were from Gelest (Tullytown, Pa., USA) or Silar Laboratories (Wilmington, N.C., USA). Silica gel was obtained from Varian, Inc. (Lake Forest, Calif., USA) with the following specifications: 5 µm particle diameter, with 200 Å average pore diameter and 180 $m^2/g$ surface area. Liquid chromatography was performed using a model HP 1100 series from Agilent (Palo Alto, Calif., USA), and chemically bonded silica gel columns were from Varian Inc. (Lake Forest, Calif., USA). Chemicals used were from Sigma-Aldrich, Inc. (Milwaukee, Wis., USA). HPLC grade acetonitrile, methanol and water were from VWR Scientific Products (San Dimas, Calif., USA).

All reactions were routinely conducted under an inert atmosphere of argon unless otherwise indicated.

Abbreviations:
k retention factor, $k=(t_R-t_0)/t_0$
$t_R$ retention time of the measured peak
$t_0$ retention time of the non-retained component
mL milliliter

EXAMPLE 1

Preparation of Trimethoxysilylpropylacetamide

A three-neck round-bottomed flask, equipped with a mechanical stirrer, a refluxing condenser and a dropping funnel, was charged with 3-aminopropyltrimethoxysilane (18 gram, Gelest Inc.), toluene (40 mL, Aldrich) and triethylamine (13 gram, Aldrich). Stirring was started, and an appropriate acyl chloride such as acetyl chloride (18 mL, Aldrich) was added dropwise to the flask. The mixture was stirred at room temperature under an argon atmosphere for 16 hours.

EXAMPLE 2

Preparation of Alkyl and Polar Modified Bonded Phases

This example illustrates a general preparation method for alkyl and polar-modified bonded phases. A 5-µm particle size silica gel was allowed to equilibrate in a desiccator for three weeks over a saturated aqueous solution of lithium chloride. A 10 gram sample of the equilibrated silica gel was suspended in 100 mL of xylene, and a 50% molar excess of a long chain trifunctional silane and pyridine (a calculated equivalent of 12 µmole of reagent per square meter of silica surface) was added. The suspension was mechanically stirred and refluxed under argon atmosphere for twenty-four hours. The mixture was filtered and washed well with xylene, methylene chloride, tetrahydrofuran, acetone, methanol and a water-methanol mixture in order to promote the hydrolysis of the remaining leaving groups of the trifunctional silane.

The alkyl or polar-modified bonded phase was then hydrolyzed with acetonitrile/tetrahydrofuran/water (1:1:1, 120 mL) and refluxed for twenty-four hours. At the end of the reaction, the silica gel was filtered and washed as described earlier in the bonding step. The resulting solid material was dried in an oven at 80° C. for 20 hours.

The dry long-chain silane functionalized silica gel (10 gram) was further modified by a short chain polar silane as described earlier in the primary bonding step. After the secondary bonding step, the silica gel was hydrolyzed with 0.5% trifluoroacetic acid in 4:1 MeOH:water at room temperature for twenty-four hours. The material was filtered and washed as described in the primary bonding step. The sample was dried at 80° C. for 20 hours.

After the bonding steps, the unreacted silanol groups on the surface of the silica gel were blocked by reaction with an endcapping reagent. Briefly, the silanol blocking reaction was performed by refluxing approximately 10 gram of the modified silica gel in 100 mL of xylene with a stoichiometric excess of endcapping reagent such as 20 mL of trimethylchlorosilane. After the mixture was refluxed for twenty-four hours, the silica gel was filtered and purified with repeated washings with xylene, methylene chloride, tetrahydrofuran, acetone, methanol, water and finally with methanol. The polar bonded phase silica gel was dried at 80° C. for 20 hours. To prepare low bonded phase surface concentrations, a reduced silane stoichiometry and/or reaction temperature can be utilized.

The resulting bonded phase was packed into two individual 150 mm length×4.6 mm I.D. columns for evaluation of the chromatographic performance.

Similar reactions and procedures were carried out to prepare additional polar-modified bonded phases, to endcap unreacted silanols on their surfaces, and to provide columns packed with polar-modified bonded silica gels.

EXAMPLES 3–11

These examples illustrate preparing phases 1–9 using the procedure described in Example 2. The silanes used to construct each phase were presented above in Table 1. For each phase, the procedure of Example 2 was used with the following exceptions:

Example 3 (Phase 1): the long-chain silane is N-(3-trimethoxysilyl)propylpalmitamide and the short-chain silane is N-(3-(trimethoxysilyl)propylacetamide.

Example 4 (Phase 2): the long-chain silane is O-octyl-N-(triethoxysilylpropyl)urethane and the short-chain silane is N-(3-(trimethoxysilyl)propylacetamide.

Example 5 (Phase 3): the long-chain silane is N-(3-trimethoxysilyl)propylpalmitamide and the short-chain silane is the endcapping reagent trimethylchlorosilane.

Example 6 (Phase 4): the long-chain silane is n-octadecyltrichlorosilane and the short-chain silane is 3-glycidoxytrimethoxysilane.

Example 7 (Phase 5): the long-chain silane is n-octyltrichlorosilane and the short-chain silane is 3-glycidoxytrimethoxysilane.

Example 8 (Phase 6): the long-chain silane is n-octadecyltrichlorosilane and the short-chain silane is 3-cyanopropyldimethylchlorosilane.

Example 9 (Phase 7): the long-chain silane is n-octyltrichlorosilane and the short-chain silane is 3-cyanopropyldimethylchlorosilane.

Example 10 (Phase 8): the long-chain silane is n-octadecyltrichlorosilane and the short-chain silane is N-(3-(trimethoxysilyl)propylacetamide.

Example 11 (Phase 9): the long-chain silane is n-octyltrichlorosilane and the short-chain silane is N-(3-(trimethoxysilyl)propylacetamide.

EXAMPLE 12

The inertness and the chemical stability of the polar-modified and alkyl bonded phases of the present invention were investigated by examining the retention factors and peak shapes of pyridine, procainamide, amitriptyline, propranolol, sorbic acid, salicylic acid, and naphthalene. Asymmetry is a factor describing the shapes of chromatographic peaks, and is defined as the ratio of the distance between the peak apex and the back side of the chromatographic curve and the front side of the curve at 10% peak height. Silanophilic activity of the bonded phases was further assessed by performing the Engelhardt test. Hydrophobic selectivity of the bonded phases was examined by investigating the relative retention times of methylene groups, and steric and hydrogen bonding interactions. The retention factor, in terms of measured parameters, is $k=(t_R-t_0)/t_0$, where $t_R$ is the retention time of the measured peak, and $t_0$ is retention time of the non-retained component. FIGS. 3A–3D and FIGS. 4A–4D show the chemical stability of polar-modified and alkyl bonded phases in acidic and basic conditions, respectively. Lines numbered 8, 12, 16, 20, 24, 28, 32, 36, 40, 44, 48, 52, 56, 60, 64 and 68 indicate the retention times for toluene, and lines numbered 9, 13, 17, 21, 25, 29, 33, 37, 41, 45, 49, 53, 57, 61, 65 and 69 represent retention factors for toluene, in acidic and basic solutions, respectively. Lines numbered 10, 14, 18, 22, 26, 30, 34, 38, 42, 46, 50, 54, 58, 62, 66 and 70 indicate peak asymmetry for toluene, and lines numbered 11, 15, 19, 23, 27, 31, 35, 39, 43, 47, 51, 55, 59, 63, 67 and 71 indicate peak asymmetry for pyridine.

As shown in FIGS. 3A–D and 4A–D, the retention time, symmetry and retention factors for toluene and pyridine were nearly constant during continuous operation over a period of time of two months or more (1500 to 3000 hours) both in 20 mM sodium phosphate buffer (pH 10) and 1% trifluoroacetic acid (pH 1.5) solutions showing no performance degradation.

EXAMPLE 13

Figure 5:
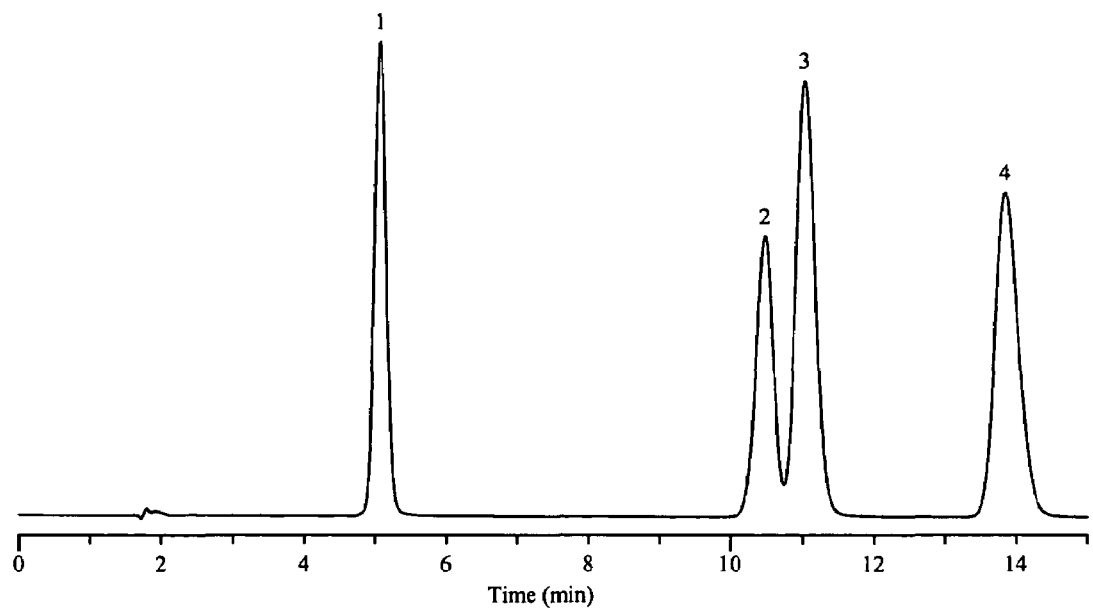
FIG. 5 illustrates the differences in selectivity of alkyl and polar-modified bonded phases for anti-ulcer drugs in 20% methanol.
Figure 5:
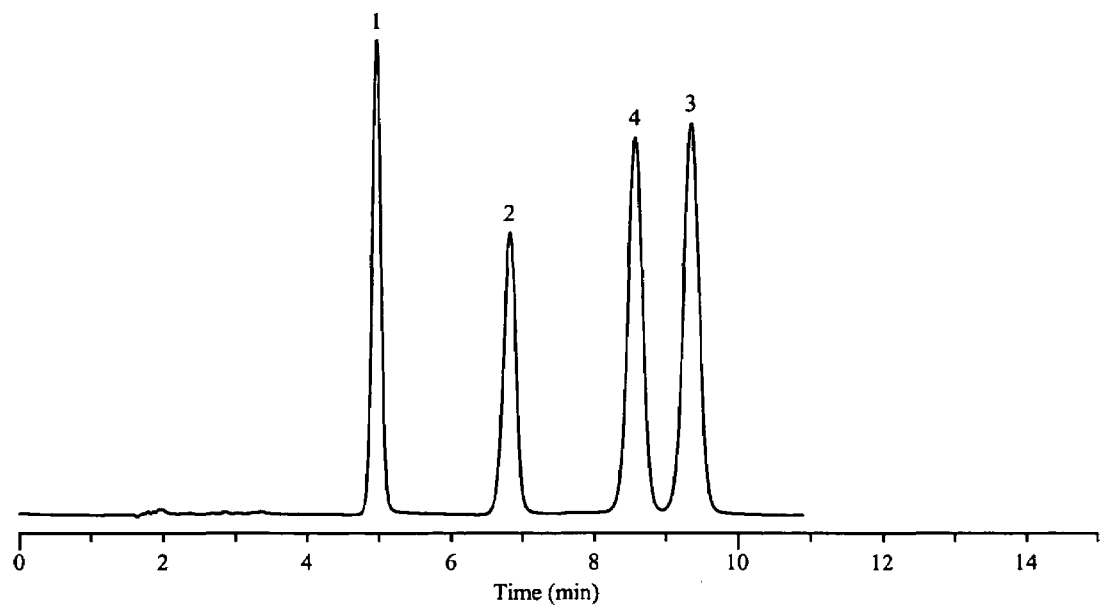

The comparative selectivities of the polar-modified and alkyl bonded phases were examined by investigating the separation of antiulcer and cephalosporin antibiotic drugs. The mixture of famotidine (peak 1), ranitidine (peak 2), nizatidine (peak 3) and cimetidine (peak 4) was chromatographed on a stationary phase comprised of phase 1, as described in Example 3 and on a C18 stationary phase, using a mixture of phosphate buffer at pH 7.0 and methanol as the mobile phase. The total elution time was less than 10 minutes and about 14 minutes on the respective stationary phases. There is not only a significant selectivity difference, but also a reversal in the elution order of the analytes between the alkyl and polar-modified phases. The chromatograms are illustrated in FIG. 5.

EXAMPLE 14

Figure 6:
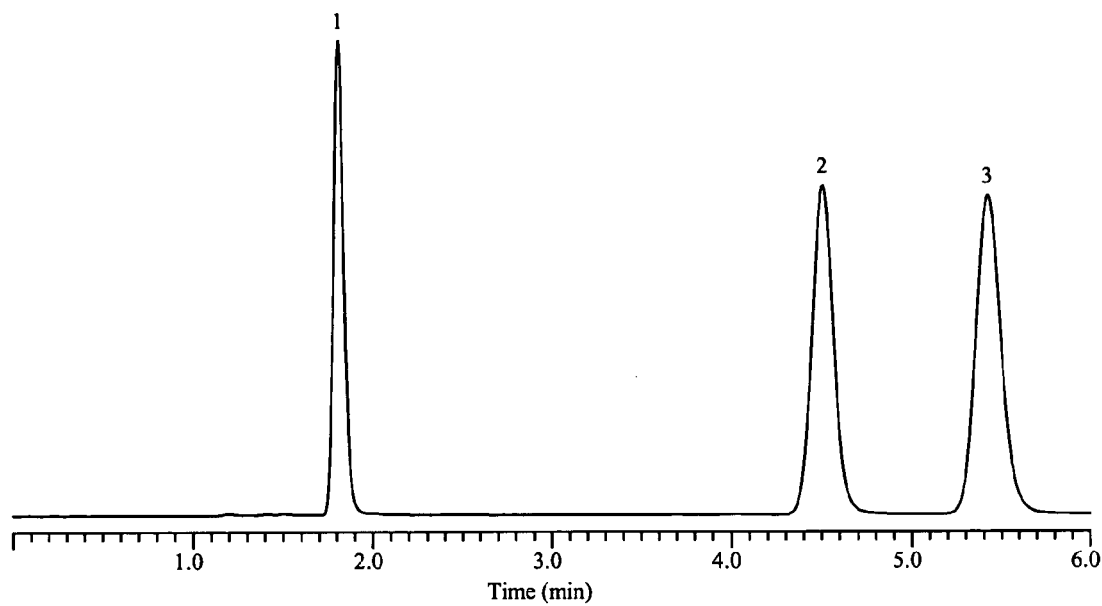
FIG. 6 illustrates the differences in selectivity of alkyl and polar-modified bonded phases for cephalosporin antibiotics in 20% methanol.
Figure 6:
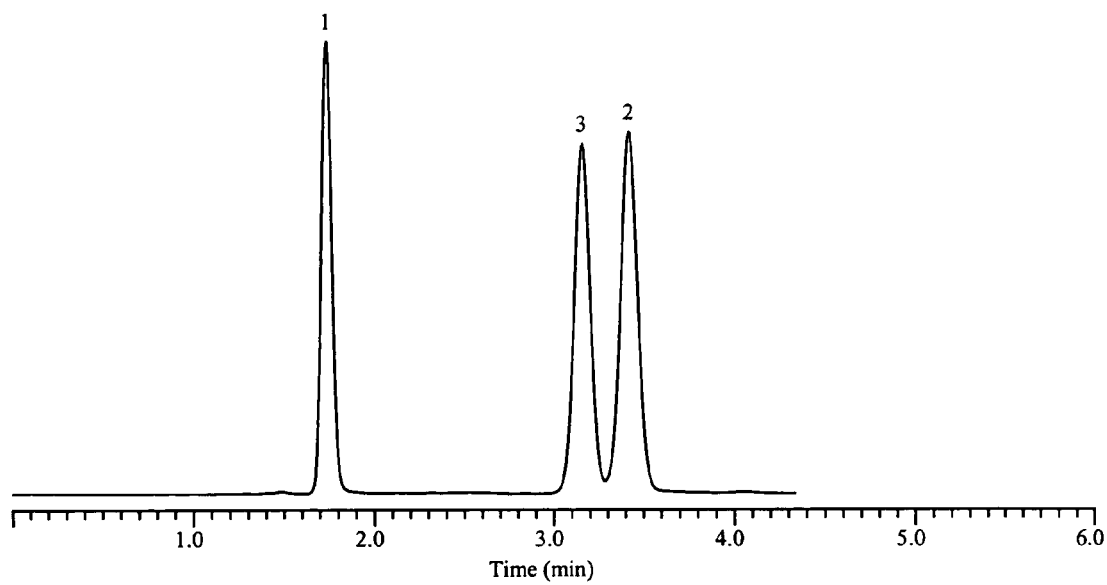

The comparative selectivities of the polar-modified and alkyl bonded phases were examined by investigating the separation of a mixture of cephalosporin antibiotics. Cefadroxil (peak 1), cefaclor (peak 2) and cephalexin (peak 3) were chromatographed on a stationary phase comprised of phase 1, as described in Example 3 and on a C18 stationary phase, using phosphate buffer at pH 3.0 and methanol mixtures. The total elution time was about 4 minutes and about 6 minutes on the respective stationary phases. There is not only a significant selectivity difference, but also a reversal in the elution order of analytes between alkyl and polar-modified phases. The chromatograms are illustrated in FIG. 6.

EXAMPLE 15

Figure 7:
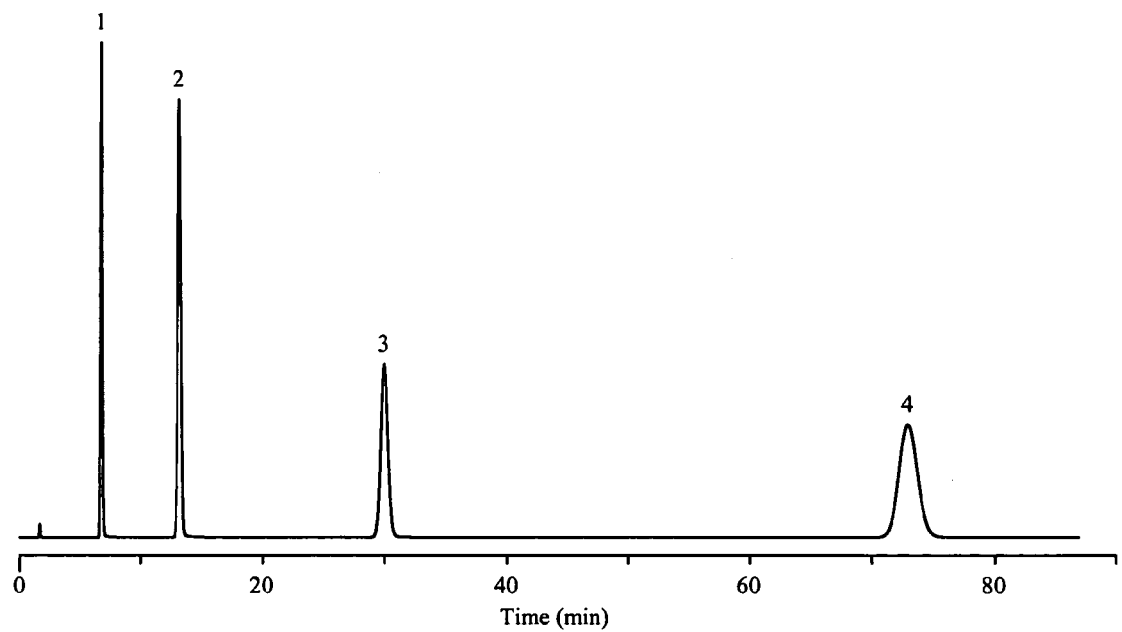
FIG. 7 illustrates the differences in selectivity of alkyl and polar-modified bonded phases for paraben drugs.
Figure 7:
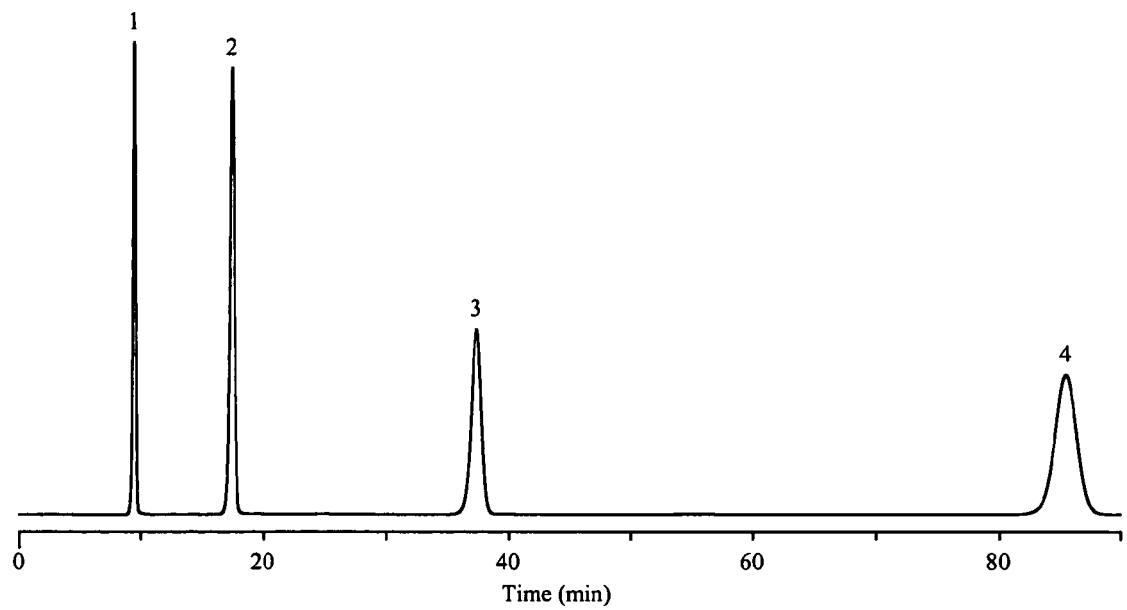

The alkyl and polar-modified columns also yield differences in selectivity under neutral unbuffered mobile phase conditions, as illustrated by the chromatographic analysis of parabens shown in FIG. 7. With a C18 alkyl bonded phase, the relative retention ratios of ethyl (peak 2), propyl (peak 3) and butyl parabens (peak 4), as compared with methyl paraben (peak 1) as an internal marker, were 1.94, 4.41 and 10.73, respectively. With the polar-modified bonded phase 1, the respective values were 1.84, 3.94 and 9.02. The methylene selectivity, calculated from the relative retention ratio between the butyl and propyl parabens, was 2.43 for the C18 alkyl bonded phase and 2.29 for the polar-modified bonded phase 1.

The parabens are retained longer on the polar-modified bonded phase 1 due to polar interactions with the stationary phase; however, the relative retention ratios are higher for the C18 alkyl bonded phase because the homologous parabens differ from methyl paraben only with respect to the number of methylene groups, which can interact with the bonded phases by a hydrophobic mechanism exclusively.

EXAMPLE 16

Figure 8:
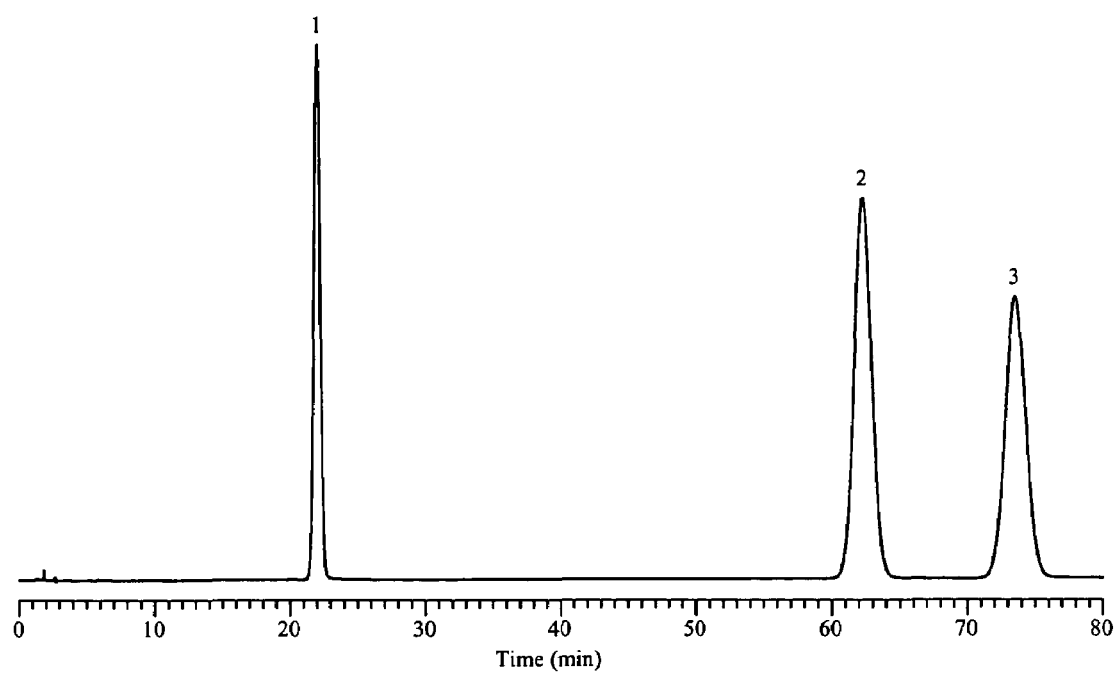
FIG. 8 illustrates the differences in selectivity of alkyl and polar-modified bonded phases for anticonvulsant drugs.
Figure 8:
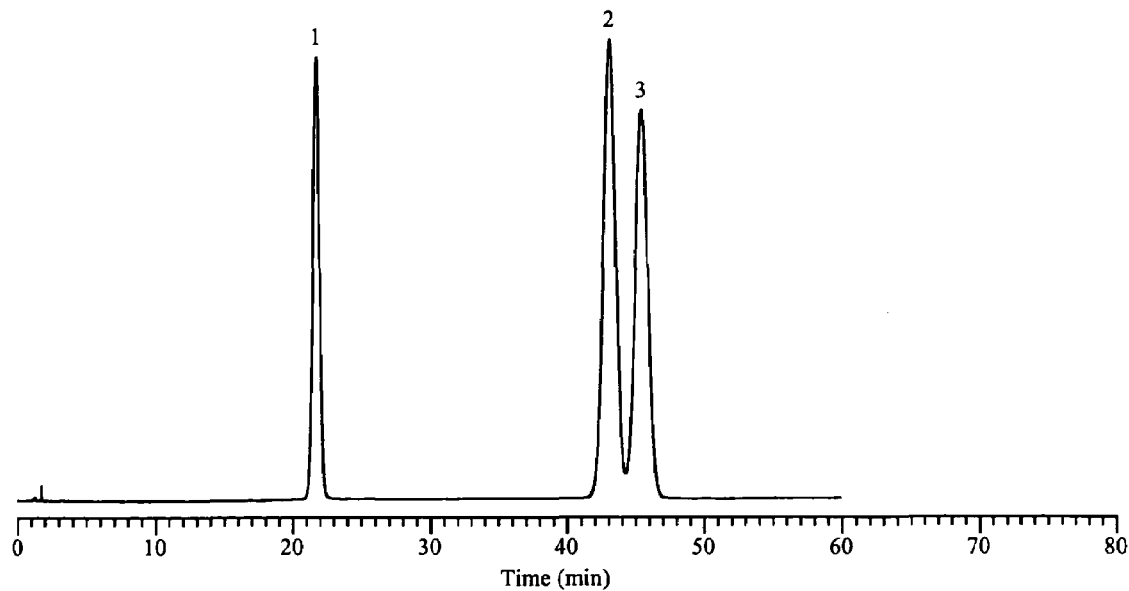

This experiment was performed as described in Example 15, using a mixture of anticonvulsant drugs, with clonazepam (peak 1) as an internal standard. Relative retention ratios for clorazepate (peak 2) and diazepam (peak 3), respectively shown in FIG. 8, were 2.83 and 3.34 using the C18 alkyl bonded phase, and 1.98 and 2.09 using the polar-modified bonded phase 1.

The anticonvulsant drugs exhibit more striking differences in their retention times on the two different stationary phases, and the trend is reversed as compared to elution profile of the parabens in Example 15. The anticonvulsant drugs interact with the bonded phases predominantly through a hydrophobic mechanism, and since the C18 alkyl bonded phase is more hydrophobic than the polar-modified bonded phase, the anticonvulsants are retained much longer on the C18 phase than on the polar modified bonded phase 1. Thus, selectivity differences between the two bonded phases are attributable to the manner in which analytes react with them, that is, whether the mechanism of interaction is hydrophobic or polar.

EXAMPLE 17

Figure 9A:
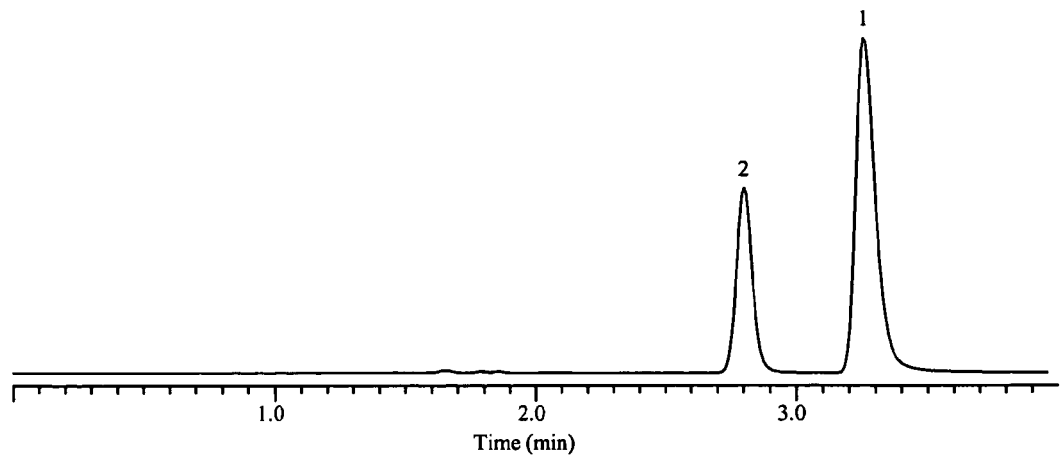
FIG. 9A and B illustrates the differences in selectivity of alkyl and polar-modified bonded phases for cold remedy ingredients.
Figure 9A:
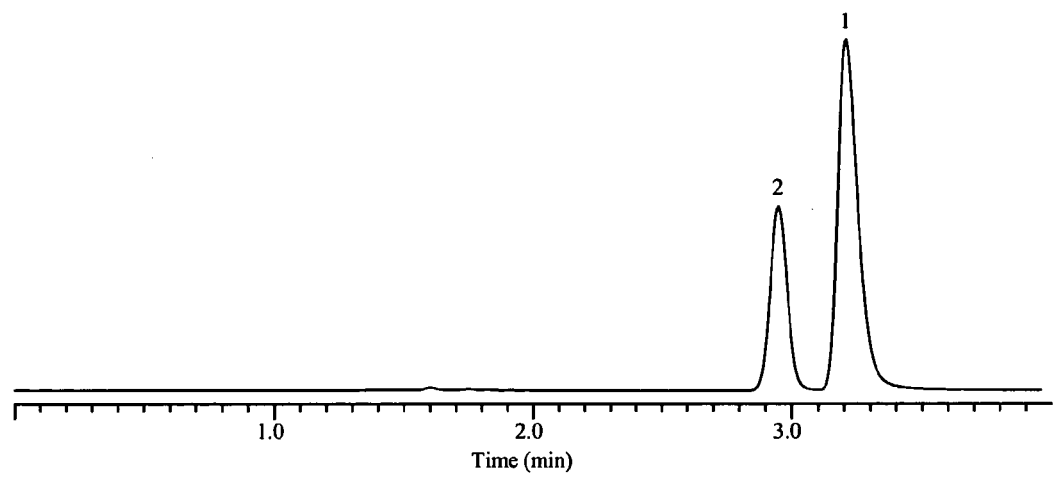
Figure 9A:
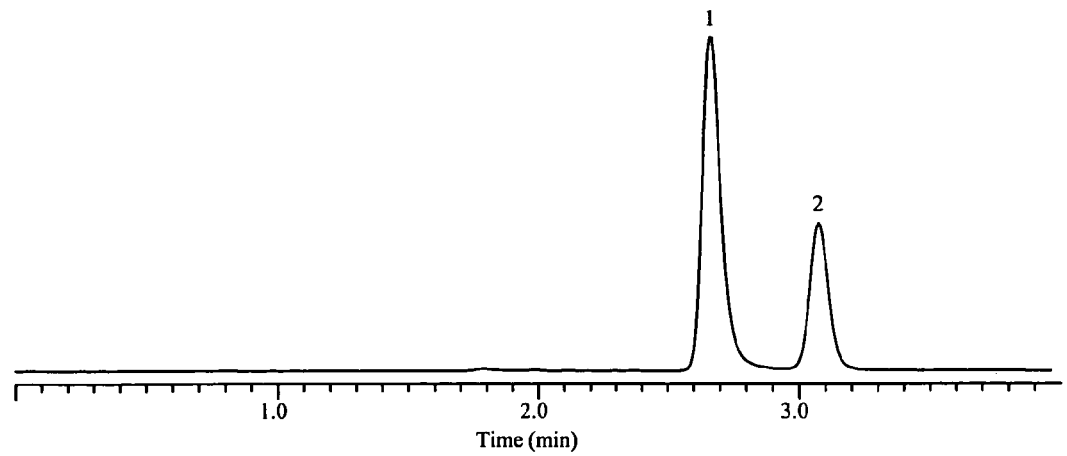
Figure 9B:
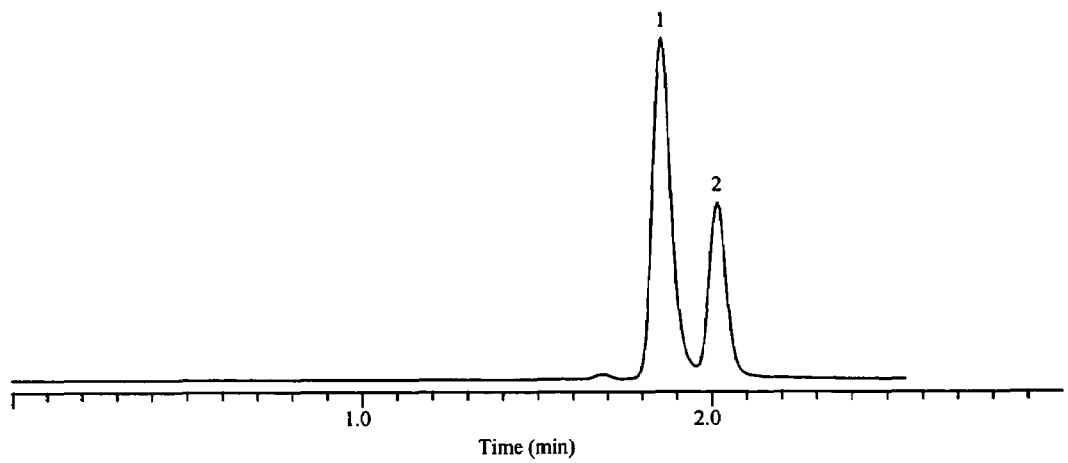
Figure 9B:
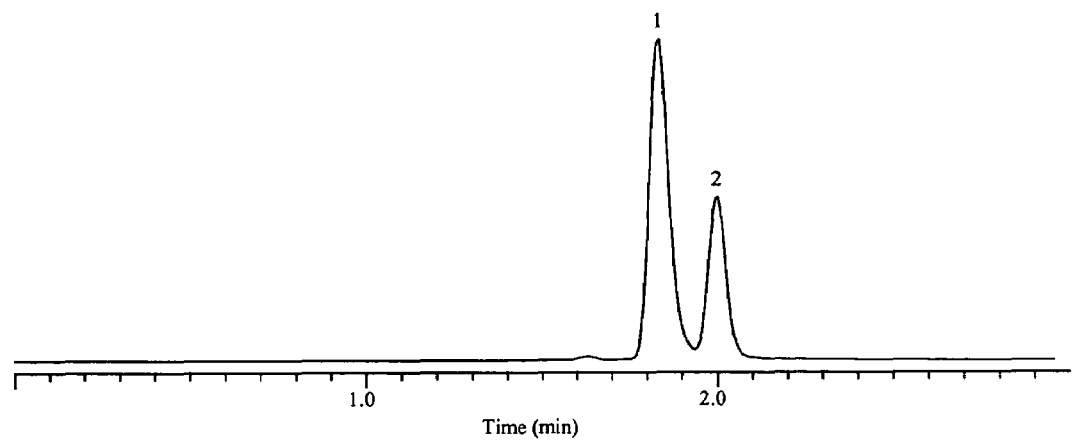
Figure 9B:
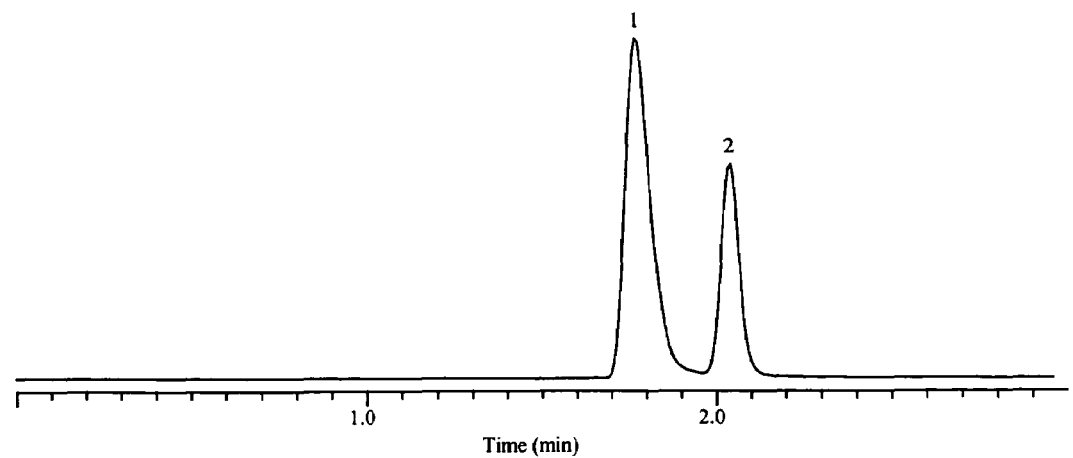

The different polar-modified stationary phases yield differences in analyte selectivity, as demonstrated by the separation of cold remedy agents. The separation of pseudoephedrine (peak 1) and acetaminophen (peak 2) was studied on stationary phases composed of C18, phase 3 and phase 8 packed into HPLC columns, and eluted using 15:85 acetonitrile/25 mM dipotassium hydrogen phosphate buffer mobile phase conditions. The order of elution of the two drugs are reversed on predominantly alkyl stationary phases (C18 and phase 8) as compared with the order of elution on the polar-embedded stationary phase (phase 3) columns, with acetaminophen retained longer on the polar-embedded phase and pseudoephedrine further retained on predominantly alkyl phases (FIG. 9A). This difference can be attributed to the difference in interaction of each drug molecule with the stationary phases. Acetaminophen has a phenolic hydroxyl and an amide moiety in its structure and can exhibit strong polar interaction with the polar functionality on the polar-embedded phase. On the other hand, pseudoephedrine carries a hydroxylated methylaminopropyl chain on a phenyl ring which can interact through hydrophobic mechanism predominantly. When the organic component of the mobile phase is increased, the elution orders of the two drugs on the predominantly alkyl phases are switched. However, the elution order of the two drugs on the polar-embedded phase remains unchanged (FIG. 9B). This demonstrates clearly the difference in the polar nature of the stationary phases.

EXAMPLE 18

Figure 10:
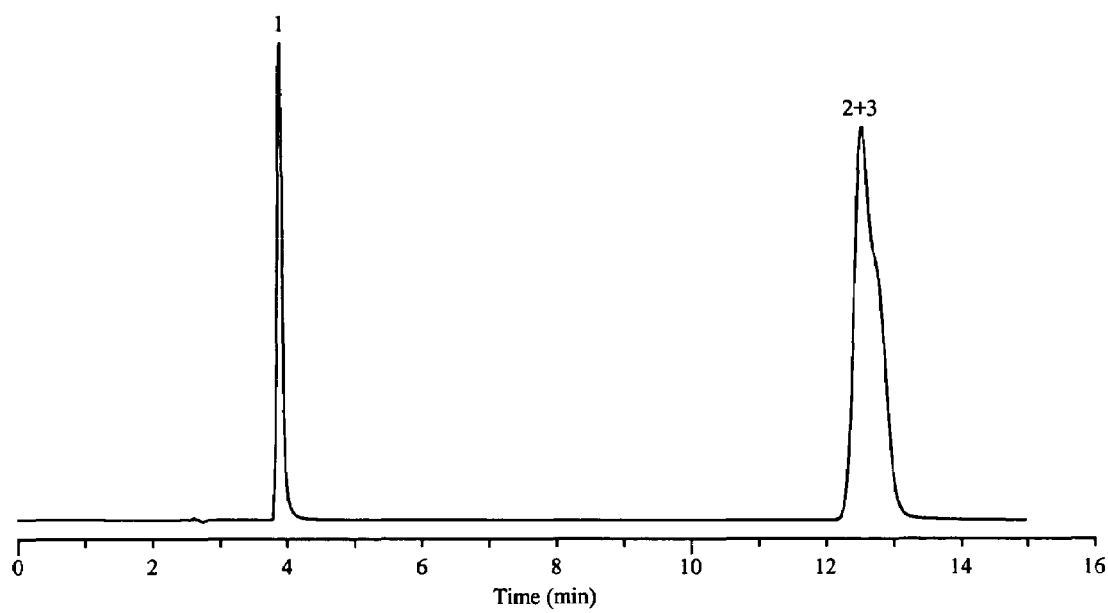
FIG. 10 illustrates the chromatographic separation of antifungal agents on alkyl and polar-modified bonded phases.
Figure 10:
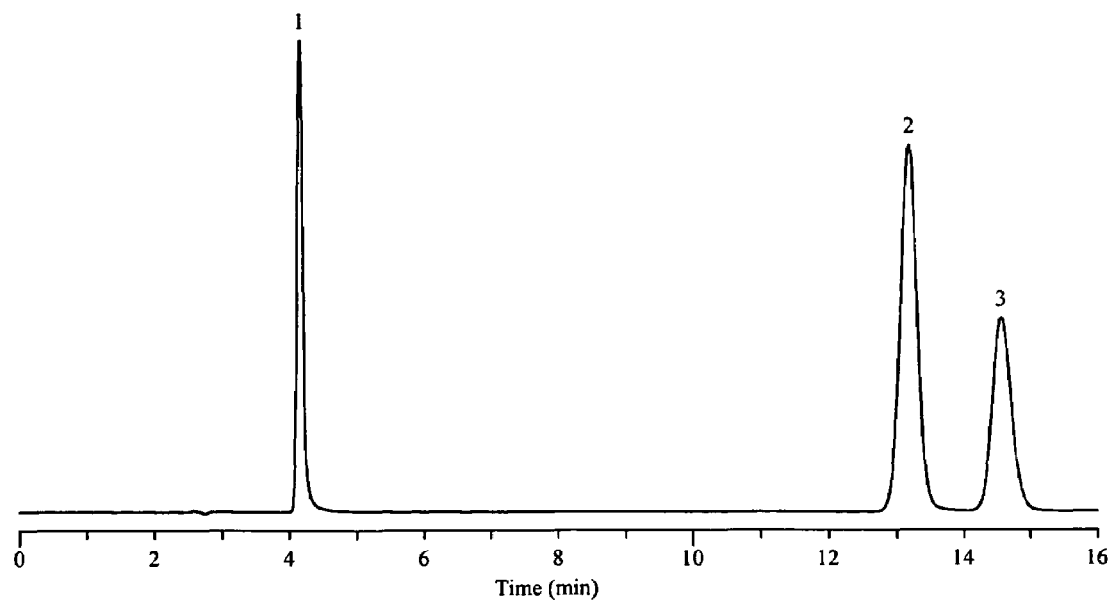

The polar-modified phases of the present invention demonstrate differences in selectivity and better separation characteristics for acidic compounds compared to traditional alkyl phases. A mixture of 4-aminobenzoic acid (peak 1), sorbic acid (peak 2) and benzoic acid (peak 3) was chromatographed on a C18 stationary phase and on polar modified phase 8, using 0.1% formic acid and acetonitrile mixtures as the mobile phase. The total elution time on both phases was about 15 minutes, as shown in FIG. 10. The perfect resolution between sorbic acid and benzoic acid was achieved only on the polar-modified bonded phase, and the separation of these two compounds was not possible on the alkyl bonded phase using these mobile phase conditions.

EXAMPLE 19

Basic compounds tend to tail on alkyl phases because of their interaction with silanols on the silica surface. This can often cause increased retention times and loss in performance (peak shape). The separation of complex mixtures of basic compounds on one of the polar-modified bonded phases (phase 1) of the present invention were examined. Three different mixtures of basic compounds were separated, as illustrated in FIGS. 11A–C. The separation of aniline homologs (aniline (peak 1), o-toluidine (peak 2), 2-ethylaniline (peak 3), N-ethylaniline (peak 4), N,N-dimethylaniline (peak 5) and N-propylaniline (peak 6)) is demonstrated in FIG. 11A. The separation of β-blockers (practolol (peak 1), pindolol (peak 2), bisoprolol (peak 3) and alprenolol (peak 4)) is demonstrated in FIG. 11B. The separation of the tricyclic antidepressants (desmethyl doxepin (peak 1), protriptyline (peak 2), desipramine (peak 3), nortriptyline (peak 4), doxepin (peak 5), imipramine (peak 6), amitriptyline (peak 7) and trimipramine (peak 8)) is demonstrated in FIG. 11C. The column packed with stationary phase 1 shows excellent peak shapes with remarkable selectivity (FIG. 11A–C).

EXAMPLE 20

Figure 12:
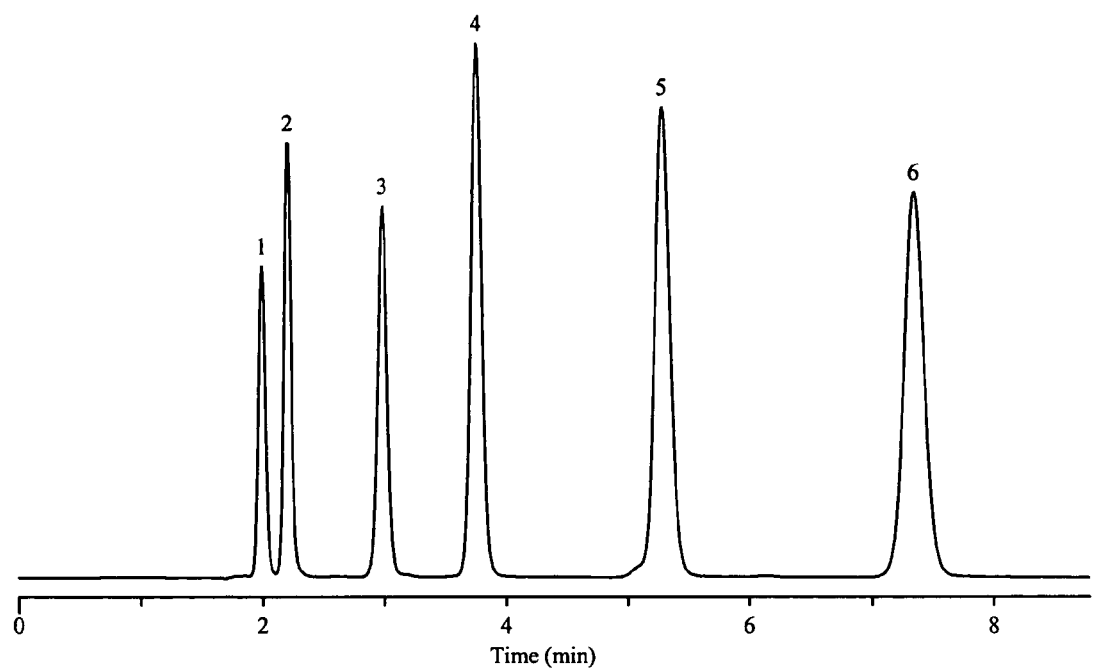
FIGS. 12A and B illustrate the chromatographic separation of nucleotides and catecholamines on a polar-modified bonded phase in 100% aqueous mobile phase conditions.
Figure 12:
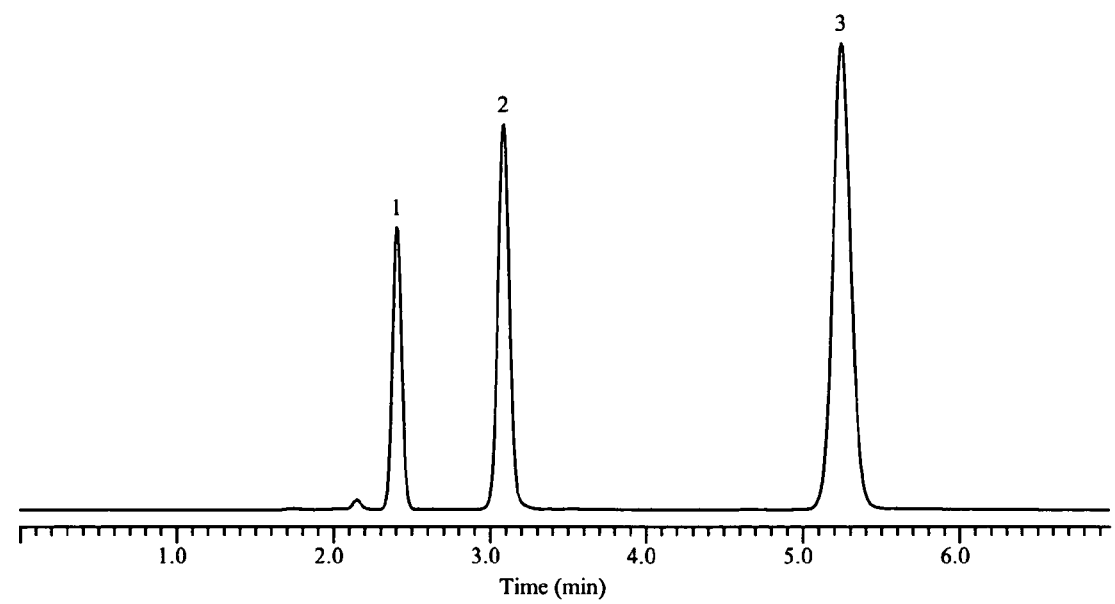

Many of the newer alkyl phases have high bonding densities designed to improve peak shape for basic compounds and stability at high pH. However, the improvement in bonding density can often lead to retention time instability in 100% aqueous mobile phases because of the highly hydrophobic nature of these phases. The polar-modified bonded phases in the present invention can provide a solution to this dilemma to give stable and reproducible analyte retention times in 100% aqueous mobile phase conditions. FIG. 12A shows the separation of nucleotides (5'-CTP (peak 1), 5'-CMP (peak 2), 5'-GDP (peak 3), 5'-GMP (peak 4), 5'-ADP (peak 5) and 5'-AMP (peak 6)), and FIG. 12B demonstrates the separation of catecholamines (norepinephrine (peak 1), epinephrine (peak 2) and dopamine (peak 3)) on polar-modified bonded phase 1 under 100% aqueous mobile phase conditions.

EXAMPLE 21

Figure 13A:
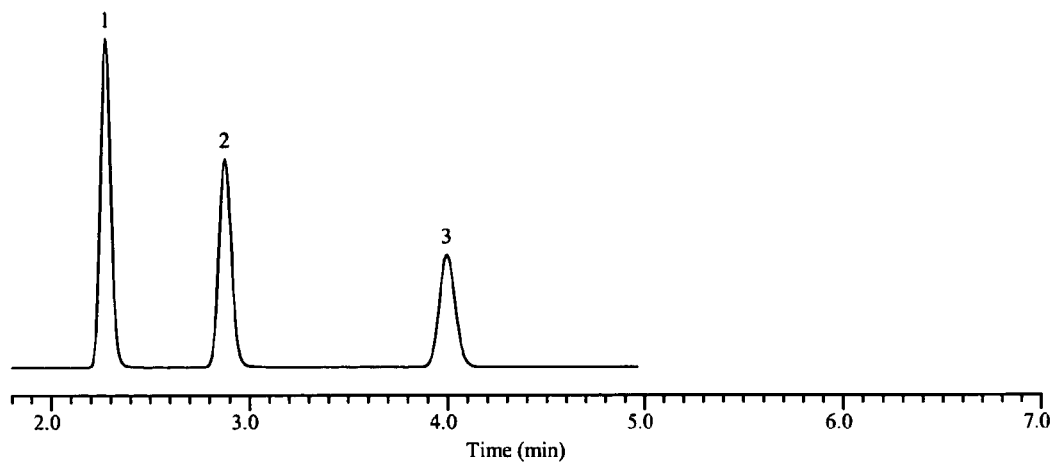
FIGS. 13A and B illustrate the chromatographic separation of fatty acids and vitamins on alkyl and polar-modified bonded phases in high organic mobile phase conditions.
Figure 13A:
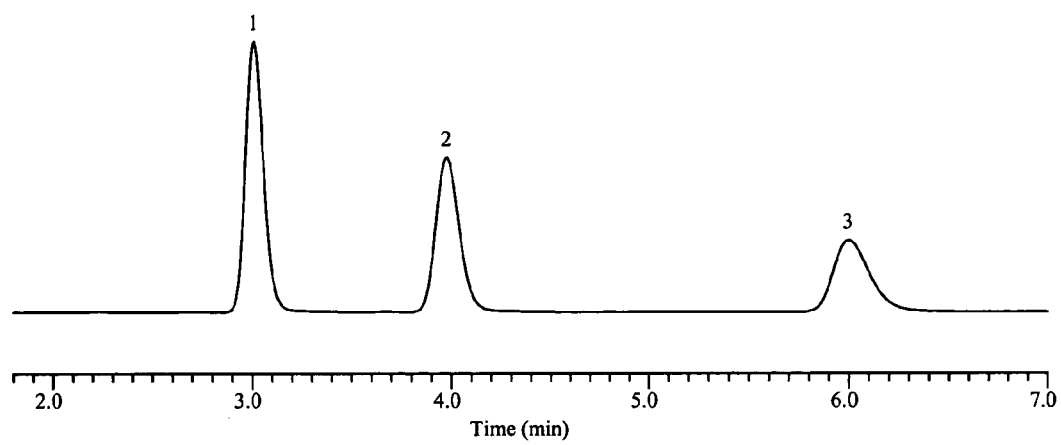
Figure 13A:
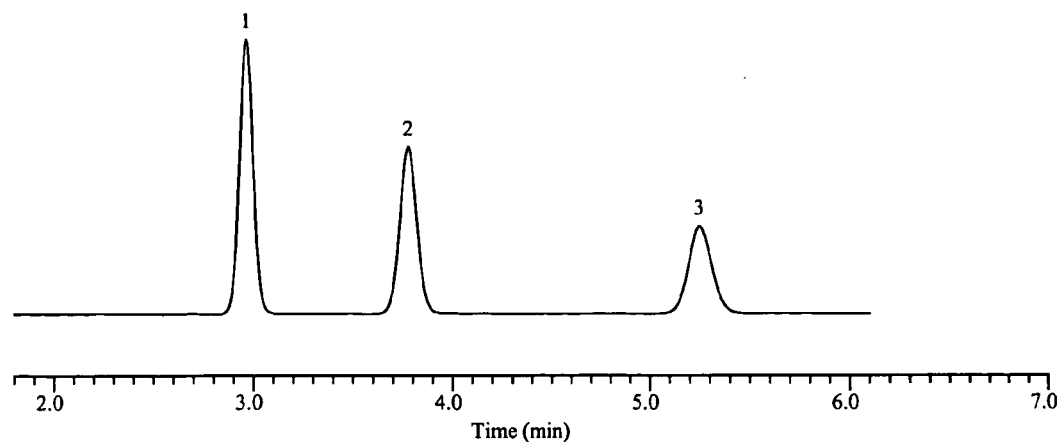
Figure 13B:
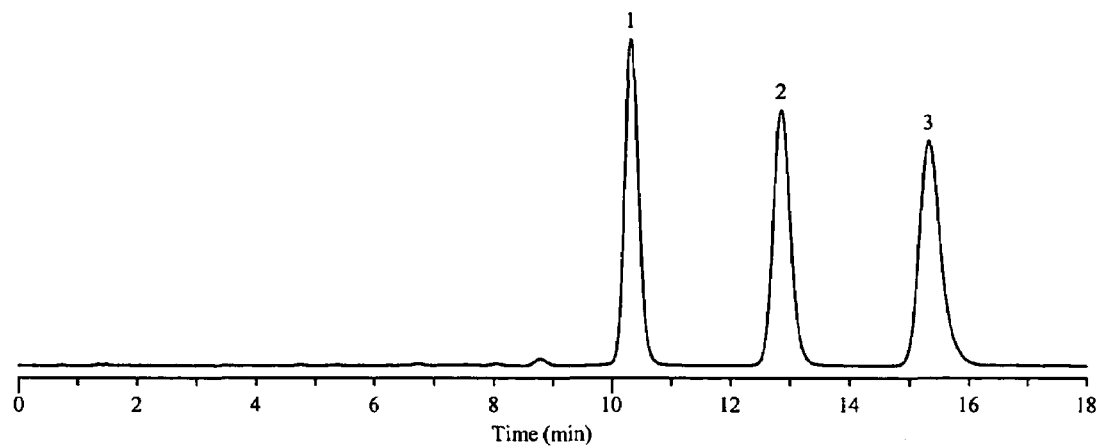
Figure 13B:
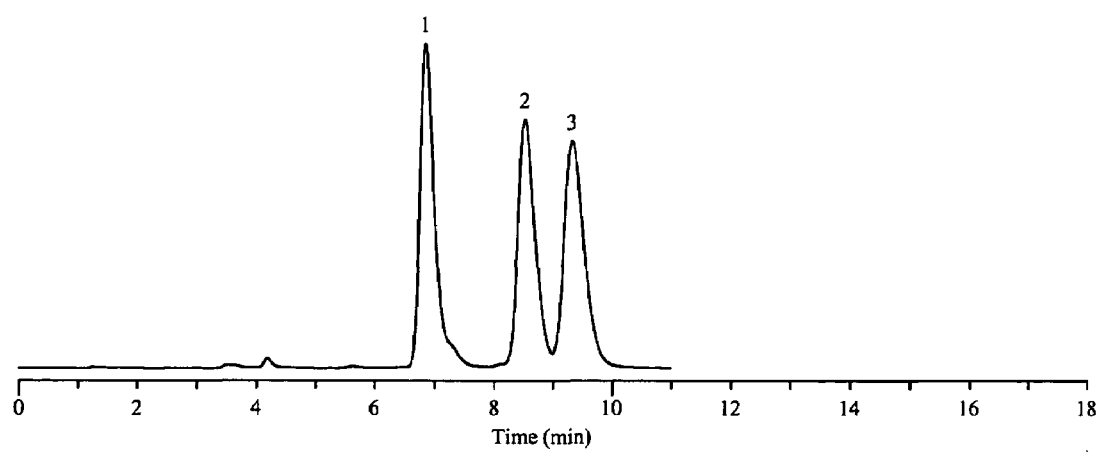
Figure 13B:
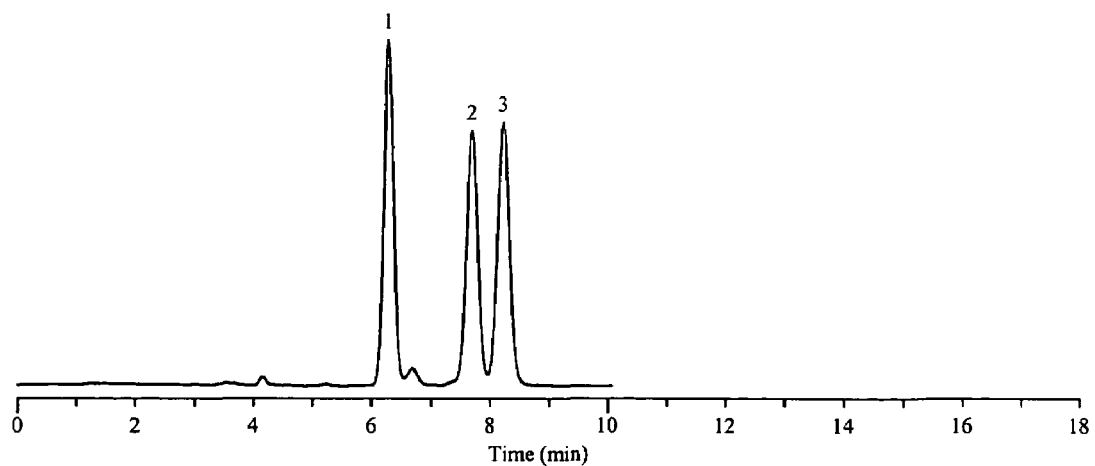

Mobile phases with high organic/aqueous ratios are ideal for LC/MS analysis as the analytes are more efficiently desolvated, thereby enhancing sensitivity, resolution, and mass accuracy. The polar-modified bonded phases of the present invention demonstrate excellent retention of fatty acids (linolenic acid (peak 1), linoleic acid (peak 2) and oleic acid (peak 3), as shown in FIG. 13A) and vitamins (δ-tocopherol (peak 1), γ-tocopherol (peak 2) and α-tocopherol (peak 3), as shown in FIG. 13B) at high concentrations of organic solvents in the mobile phase. Therefore the polar-modified bonded phases of the invention are useful for LC/MS analyses and yield optimal MS signal intensities.

EXAMPLE 22

Figure 14:
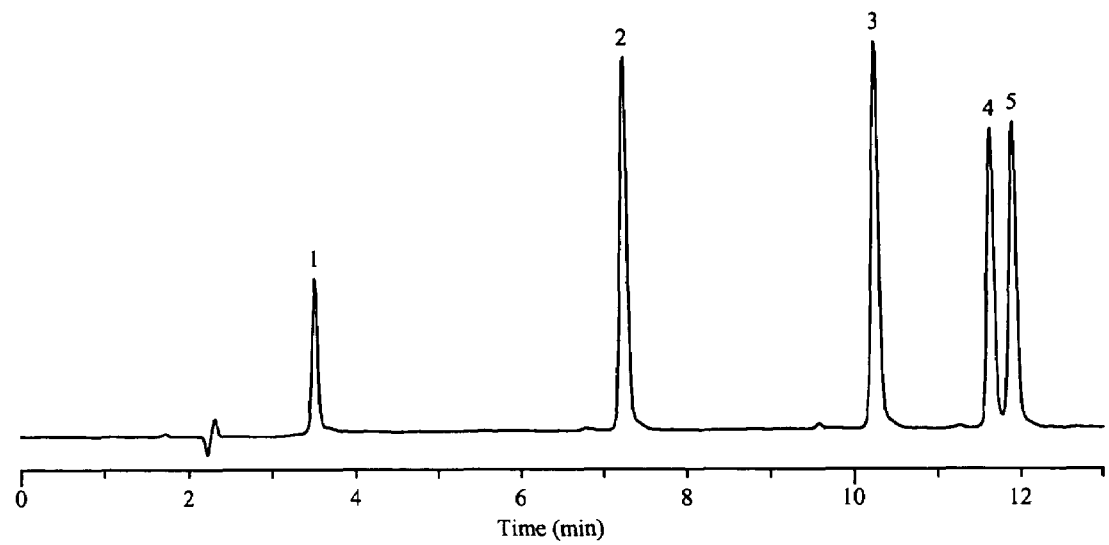
FIG. 14 illustrates the chromatographic separation of a mixture of peptides using alkyl and polar-modified bonded phases.
Figure 14:
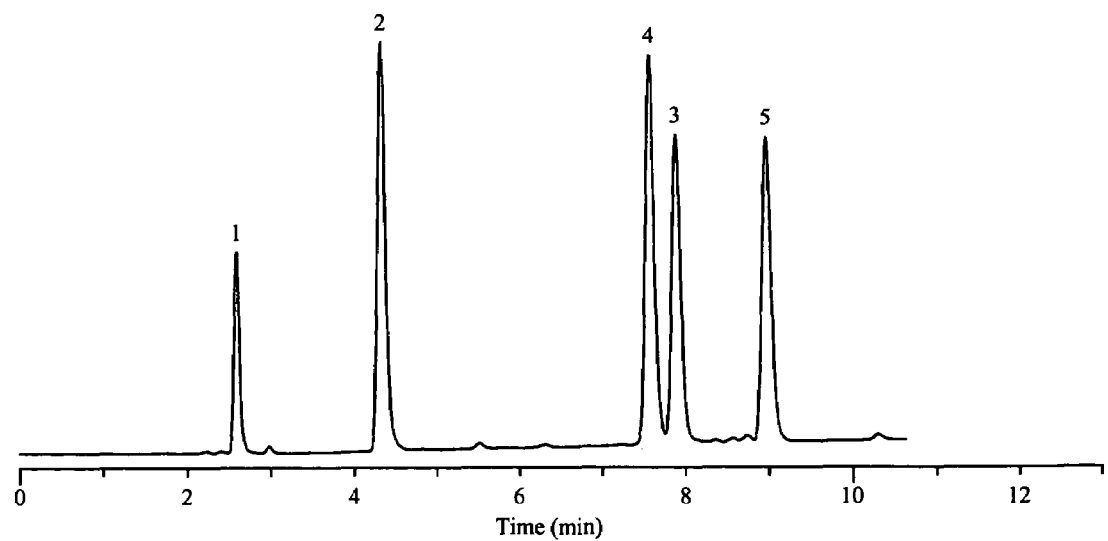

The selectivity of alkyl and polar-modified bonded phases was further examined for the separations of peptides. A mixture of Gly-Tyr (peak 1), Val-Tyr-Val (peak 2), methionine enkephalin (peak 3), angiotensin II (peak 4) and leucine enkephalin (peak 5) was chromatographed using a mobile phase mixture of 0.1% TFA and acetonitrile on an octyl phase (C8) and compared with phase 2 (a polar-embedded C8 alkyl). The total elution time was about 12 minutes as shown in FIG. 14. There is not only a significant selectivity difference, but also a reversal in the elution order of methionine enkephalin and angiotensin II between the alkyl and polar-modified bonded phases.

What is claimed is:

1. A composition for use as a stationary phase in chromatography comprising an inorganic substrate that is modified with at least one silane having the formula

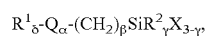

wherein $R^1$ is hydrogen, $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl;

α is 0 or 1;

β is 0–30;

γ is 0, 1 or 2;

δ is 0–3;

$R^2$ is $C_1$–$C_{100}$ substituted or unsubstituted hydrocarbyl, cycloalkyl, heterocycloalkyl, aryl, or heteroaryl; wherein the substituents are selected from $C_1$–$C_{12}$ hydrocarbyl, hydroxyl, alkoxy, halogen, amino, nitro, sulfo, and carbonyl;

Q is independently selected from —NHC(O)—, —C(O)NH—, —OC(O)NH—, —NHC(O)O—, —NHC(O)NH—, —NCO, —CHOHCHOH—, CH$_2$OCHCH$_2$O—, —(CH$_2$CH$_2$O)$_n$—, —(CH$_2$CH$_2$CH$_2$O)$_n$—, —C(O)—, —C(O)O—, —OC(O)—, CH$_3$C(O)CH$_2$—, —S—, —SS—, —CHOH—, —O—, —SO—, —SO$_2$—, —SO$_3$—, —OSO$_3$—, —SO$_2$NH—, —SO$_2$NMe—, —NH—, —NMe—, —NMe$_2$$^+$—, —N[(CH$_2$)$_n$]$_2$$^+$—, —CN, —NC, —CHOCH—, —NHC(NH)NH—, —NO$_2$, —NO, —OPO$_3$—, where n is 1–30; and X is a leaving group.

wherein said inorganic substrate is equilibrated in an atmosphere having a defined relative humidity of less than 40% prior to being modified with the at least one silane, sufficiently to minimize anion exchange activity and enhance stability to base and acid treatment.

2. The composition of claim 1, wherein the inorganic substrate is a metal oxide or metalloid oxide.

3. The composition of claim 2, wherein the inorganic substrate is in the form of a monolith or porous particles.

4. The composition of claim 3, wherein said porous particles have an average pore diameter from about 60 Å to about 1000 Å.

5. The composition of claim 3, wherein said porous particles have an average particle size from about 3 µm to about 60 µm.

6. The composition of claim 2, wherein the inorganic substrate comprises silica.

7. The composition of claim 6, wherein the inorganic substrate comprises silica gel modified with at least two silanes.

8. The composition of claim 7, wherein the silica gel is modified with a first silane, and subsequently the silica gel substrate is modified with a second silane.

9. The composition of claim 8, wherein the first or second silane or both the first and the second silanes comprises a mixture of silanes.

10. The composition of claim 8, wherein the first silane has a value for E of 1, α is 1, µ is 1–30, γ is 0, 1, or 2, $R^1$ is a substituted or unsubstituted $C_1$–$C_{30}$ hydrocarbyl, Q is amido or carbamyl, and the second silane has a value for δ of 1, α is 1, β is 1–30, γ is 0, 1, or 2, $R^1$ is a substituted or unsubstituted $C_1$–$C_6$ hydrocarbyl, and Q is amido, carbamyl, cyano or glycidoxy.

11. The composition of claim 8, wherein the first silane has a value for δ of 1, α is 0, β is 8–30, γ is 0, 1 or 2, $R_1$ is H, and the second silane has a value for δ of 1, $R^1$ is a substituted or unsubstituted $C_1$–$C_6$ hydrocarbyl, and Q is amido, cyano or glycidoxy.

12. The composition of claim 8, wherein the first silane has a value for δ of 1, α is 0, β is 8–30, γ is 0, 1 or 2, $R^1$ is H, and the second silane has a value for δ of 1, $R^1$ is a substituted or unsubstituted $C_1$–$C_6$ hydrocarbyl, and Q is thio, dithio, ether, sulfinyl, sulfonyl, sulfonic acid, sulfate, sulfonamido, amino, nitrile, isonitrile, epoxy, guanidino, nitro, nitroso, or phosphate.

13. The composition of claim 7, wherein the silica gel substrate is modified with at least one silane wherein δ is from 0 to 3, and at least one additional silane wherein δ is 0 or 1.

14. The composition of claim 7, wherein the additional silane is an endcapping silane.

15. The composition of claim 14, wherein the endcapping silane is a monosilane, disilane, trisilane or tetrasilane, or a combination thereof.

16. The composition of claim 15, wherein the monosilane is trimethylchlorosilane, N,N-dimethyltrimethylsilylamine, trimethylsilylimidazole, dimethyldichlorosilane, dimethoxydimethylsilane, trimethylsilanol, trimethylsilylphosphine, or N-trimethylsilylacetamide.

17. The composition of claim 15, wherein the disilane is hexamethyldisilazane or 1,3-dimethoxytetramethyldisiloxane.

18. The composition of claim 15, wherein the trisilane is hexamethylcyclotrisiloxane.

19. The composition of claim 15, wherein the tetrasilane is octamethylcyclotetrasiloxane.

20. The composition of claim 7, wherein the silica gel is modified by the following steps:
    (a) equilibrating the silica gel in an atmosphere having a defined relative humidity;
    (b) modifying the silica gel with at least one silane; and
    (c) further modifying the silica gel with an endcapping silane.

21. The composition of claim 20, further comprising the step of modifying the silica gel with a second silane.

22. The composition of claim 1, wherein the atmosphere having a defined relative humidity is provided by hydrated salts or saturated salt solutions.

23. The composition of claim 1, wherein X is halogen, alkoxy, amino, or acyloxy.

24. The composition of claim 1, wherein Q, $R^1$ or $R^2$ is a chiral recognition ligand.

25. The composition of claim 24, wherein the chiral recognition ligand is optically active.

26. The composition of claim 24, wherein the chiral recognition ligand is a cyclodextrin.

27. The composition of claim 1, wherein the inorganic substrate is modified by the following steps:
    a) equilibrating the inorganic substrate in an atmosphere having a defined relative humidity;
    b) modifying the inorganic substrate with at least one silane; and
    c) further modifying the inorganic substrate with an endcapping silane.

28. The composition of claim 1, wherein the retention time, peak symmetry and retention factor for analytes separated on said stationary phase varies by no more than about 5% even when exposed to acidic or basic elution conditions for 3000 hours.

29. The composition of claim 1, wherein the relative humidity is from about 0% to about 10%, from about 10% to about 20%, from about 20% to about 30%, or from about 30% to about 40%.

* * * * *